(12) United States Patent
Chen

(10) Patent No.: US 11,650,468 B2
(45) Date of Patent: May 16, 2023

(54) DISPLAY PANEL AND DISPLAY APPARATUS

(71) Applicant: Xiamen Tianma Micro-Electronics Co., Ltd., Xiamen (CN)

(72) Inventor: Changdi Chen, Xiamen (CN)

(73) Assignee: XIAMEN TIANMA MICRO-ELECTRONICS CO., LTD., Xiamen (CN)

( * ) Notice: Subject to any disclaimer, the term of this patent is extended or adjusted under 35 U.S.C. 154(b) by 0 days.

(21) Appl. No.: 17/681,527

(22) Filed: Feb. 25, 2022

(65) Prior Publication Data

US 2022/0179270 A1    Jun. 9, 2022

(30) Foreign Application Priority Data

Oct. 29, 2021   (CN) .......................... 202111271819.8

(51) Int. Cl.
*G02F 1/1362*    (2006.01)
*G09G 3/36*    (2006.01)

(52) U.S. Cl.
CPC ..... *G02F 1/136286* (2013.01); *G09G 3/3688* (2013.01)

(58) Field of Classification Search
CPC .................................................... G02F 1/1362
See application file for complete search history.

(56) References Cited

U.S. PATENT DOCUMENTS

| 2017/0011685 | A1* | 1/2017 | Jeon ..................... H01L 27/3262 |
| 2017/0025487 | A1* | 1/2017 | Byun ....................... G09G 3/32 |
| 2019/0235334 | A1* | 8/2019 | Wu ....................... G09G 3/2092 |
| 2020/0013337 | A1* | 1/2020 | Cho ......................... H10K 71/80 |
| 2020/0266296 | A1* | 8/2020 | Chu-Kung ............ H01L 29/165 |

FOREIGN PATENT DOCUMENTS

| CN | 109285494 |   | * | 1/2019 |   |
| CN | 109285494 | A |   | 1/2019 |   |
| CN | 109300406 | A |   | 2/2019 |   |
| CN | 109300406 |   | * | 4/2021 | ............... G09F 9/30 |
| CN | 112735315 |   | * | 4/2021 |   |
| CN | 113838401 |   | * | 12/2021 |   |

* cited by examiner

*Primary Examiner* — Sang V Nguyen
(74) *Attorney, Agent, or Firm* — Christensen O'Connor Johnson Kindness PLLC

(57) ABSTRACT

Provided are a display panel and a display apparatus. In an embodiment, the display panel includes first sub-pixel rows, first gate lines, second sub-pixel rows, and second gate lines. The first sub-pixel row includes sub-pixels arranged along a first direction and is electrically connected to the first gate line. The second sub-pixel row includes sub-pixels arranged along the first direction and is electrically connected to the second sub-pixel row. The second gate line extends along the first direction. A length of the second gate line is smaller than a length of the first gate line. The display panel further includes a gate compensation line electrically connected to the second gate line. The gate compensation line and the second gate line are arranged along the second direction. The gate compensation line and the second gate line are electrically connected to a same second sub-pixel row.

20 Claims, 16 Drawing Sheets

DISPLAY PANEL AND DISPLAY APPARATUS

CROSS-REFERENCE(S) TO RELATED APPLICATION

The present application claims priority to Chinese Patent Application No. 202111271819.8, filed on Oct. 29, 2021, the content of which is incorporated herein by reference in its entirety.

TECHNICAL FIELD

The present disclosure relates to the field of display technologies, and, particularly, relates to a display panel and a display apparatus.

BACKGROUND

With development of science and technology, more and more display apparatuses are widely applied in people's daily life and work, and have become indispensable tools for people today. Moreover, with development of display technology, consumers' requirements for display screens continue to increase, and various display screens emerge endlessly, such as liquid crystal display screens, and organic light-emitting display screens. On this basis, specially shaped screen displays, 3D displays, touch displays, curved-screen displays, ultra-high resolution displays, and other technologies are also emerging.

A specially shaped display panel is a display panel with a special shape modified on the basis of a conventional rectangular display panel. The commonly used specially shaped display panel usually has an arc shape, a circular shape, a triangular shape, etc., and such a specially shaped display panel has a problem of uneven display.

SUMMARY

In a first aspect of the present disclosure, a display panel is provided. In an embodiment, the display panel has a first display region and a second display region, and the display panel includes: a plurality of first sub-pixel rows and a plurality of first gate lines arranged in the first display region, each first sub-pixel row of the plurality of first sub-pixel rows including a plurality of sub-pixels arranged along a first direction, and the plurality of first sub-pixel rows being arranged in a second direction; the second direction intersects with the first direction; the first display region and the second display region are arranged along the second direction; and each of the plurality of first gate lines is electrically connected to a respective first sub-pixel row of the plurality of first sub-pixel rows, and each of the plurality of first gate lines extends along the first direction; a plurality of second sub-pixel rows and a plurality of second gate lines arranged in the second display region; each second sub-pixel row of the plurality of second sub-pixel rows comprises a plurality of sub-pixels arranged along the first direction, and the plurality of second sub-pixel rows is arranged along the second direction; each of the plurality of second gate lines is connected to a respective second sub-pixel row of the plurality of second sub-pixel rows, and each of the plurality of second gate lines extends along the first direction; and a length of one of the plurality of second gate lines is smaller than a length of one of the plurality of first gate lines; at least one gate compensation line electrically connected to the plurality of second gate lines, one of the at least one gate compensation line and one of the plurality of second gate lines being arranged along the second direction; and one of the at least one gate compensation line and one of the plurality of second gate lines that are connected to each other being electrically connected to a same second sub-pixel row of the plurality of second sub-pixel rows; transistors; pixel electrodes; and data lines. In an embodiment, one of the transistors comprises a control electrode electrically connected to one of the plurality of second gate lines, a first electrode electrically connected to one of the pixel electrodes, and a second electrode electrically connected to one of the data lines. In an embodiment, one of the transistors comprises an active layer; the active layer has a first doping region and at least two second doping regions; the first doping region is doped with a material different from a material with which each of the at least two second doping regions is doped, the first doping region is located between two adjacent second doping regions of the at least two second doping regions; one of the at least two second doping regions is electrically connected to the first electrode, and another one of at least two second doping regions is electrically connected to the second electrode. In an embodiment, an orthographic projection of the plurality of second gate lines on a plane of the display panel overlaps with an orthographic projection of the first doping region on the plane of the display panel. In an embodiment, an orthographic projection of the at least one gate compensation line on the plane of the display panel does not overlap with the orthographic projection of the first doping region on the plane of the display panel.

In a second aspect of the present disclosure, a display apparatus is provided. In an embodiment, the display apparatus includes a display panel. In an embodiment, the display panel has a first display region and a second display region, and the display panel includes: a plurality of first sub-pixel rows and a plurality of first gate lines arranged in the first display region, each first sub-pixel row of the plurality of first sub-pixel rows including a plurality of sub-pixels arranged along a first direction, and the plurality of first sub-pixel rows being arranged in a second direction; the second direction intersects with the first direction; the first display region and the second display region are arranged along the second direction; and each of the plurality of first gate lines is electrically connected to a respective first sub-pixel row of the plurality of first sub-pixel rows, and each of the plurality of first gate lines extends along the first direction; a plurality of second sub-pixel rows and a plurality of second gate lines arranged in the second display region; each second sub-pixel row of the plurality of second sub-pixel rows comprises a plurality of sub-pixels arranged along the first direction, and the plurality of second sub-pixel rows is arranged along the second direction; each of the plurality of second gate lines is connected to a respective second sub-pixel row of the plurality of second sub-pixel rows, and each of the plurality of second gate lines extends along the first direction; and a length of one of the plurality of second gate lines is smaller than a length of one of the plurality of first gate lines; at least one gate compensation line electrically connected to the plurality of second gate lines, one of the at least one gate compensation line and one of the plurality of second gate lines being arranged along the second direction; and one of the at least one gate compensation line and one of the plurality of second gate lines that are connected to each other being electrically connected to a same second sub-pixel row of the plurality of second sub-pixel rows; transistors; pixel electrodes; and data lines. In an embodiment, one of the transistors comprises a control electrode electrically connected to one of the plurality of second gate lines, a first electrode electrically connected to one of the pixel electrodes, and a second electrode electrically connected to one of the data lines. In an embodiment, one of the transistors comprises an active layer; the active layer has a first doping region and at least two second doping regions; the first doping region is doped with a material different from a material with which each of the at least two second doping regions is doped, the first doping region is located between two adjacent second doping regions of the at least two second doping regions; one of the at least two second doping regions is electrically connected to the first electrode, and another one of at least two second doping regions is electrically connected to the second electrode. In an embodiment, an orthographic projection of the plurality of second gate lines on a plane of the display panel overlaps with an orthographic projection of the first doping region on the plane of the display panel. In an embodiment, an orthographic projection of the at least one gate compensation line on the plane of the display panel does not overlap with the orthographic projection of the first doping region on the plane of the display panel.

DESCRIPTION OF THE DRAWINGS

In order to more clearly illustrate technical solutions of embodiments of the present disclosure, the accompanying drawings used in the embodiments are briefly described below. The drawings described below are merely a part of the embodiments of the present disclosure. Based on these drawings, those skilled in the art can obtain other drawings without any creative effort.

DETAILED DESCRIPTION

In order to better illustrate technical solutions of the present disclosure, the embodiments of the present disclosure are described in detail with reference to the drawings.

It should be clear that the described embodiments are merely part of the embodiments of the present disclosure rather than all of the embodiments. All other embodiments obtained by those skilled in the art without paying creative labor shall fall into the protection scope of the present disclosure.

The terms used in the embodiments of the present disclosure are merely for the purpose of describing specific embodiment, rather than limiting the present disclosure. The terms "a", "an", "the" and "said" in a singular form in an embodiment of the present disclosure and the attached claims are also intended to include plural forms thereof, unless noted otherwise.

It should be understood that the term "and/or" used in the context of the present disclosure is to describe a correlation relation of related objects, indicating that there may be three relations, e.g., A and/or B may indicate only A, both A and B, and only B. In addition, the symbol "/" in the context generally indicates that the relation between the objects in front and at the back of "/" is an "or" relationship.

It should be understood that although the terms 'first' and 'second' may be used in the present disclosure to describe display region s, these display region s should not be limited to these terms. These terms are used only to distinguish the display region s of the display panel from each other. For example, without departing from the scope of the embodiments of the present disclosure, a first display region may also be referred to as a second display region. Similarly, the second display region may also be referred to as the first display region.

Figure 1:
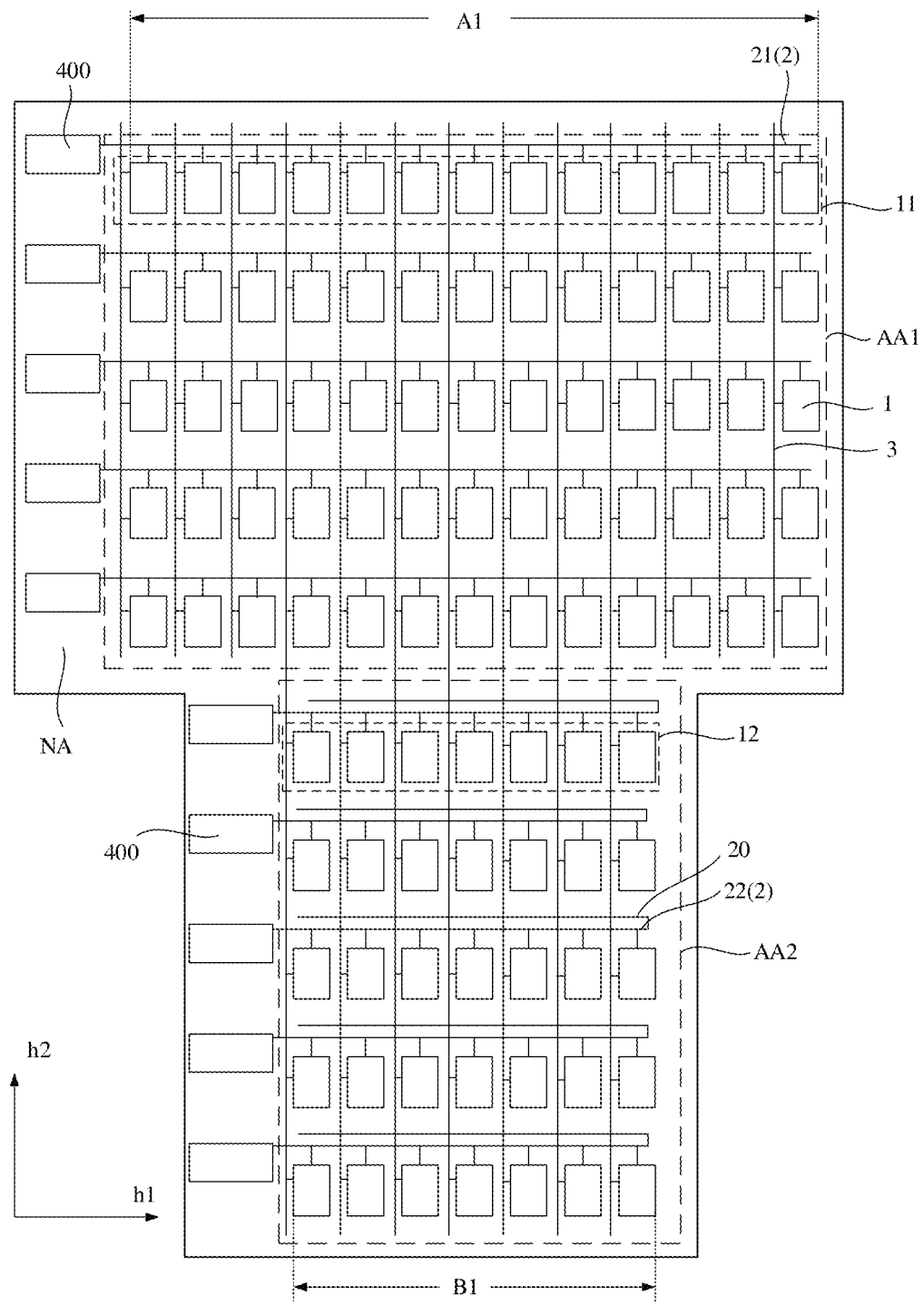
FIG. 1 is a schematic diagram showing a display panel according to an embodiment of the present disclosure.

The present disclosure provides a display panel. FIG. 1 is a schematic diagram showing a display panel according to an embodiment of the present disclosure. As shown in FIG. 1, the display panel includes a first display region AA1 and a second display region AA2. The second display region AA2 and the first display region AA1 are arranged along a second direction h2. Exemplarily, as shown in FIG. 1, in an embodiment of the present disclosure, a length A1 of the first display region AA1 along a first direction h1 is set to be greater than a length B1 of the second display region AA2 along the first direction h1, so that the display panel has a shape similar to "T" as shown in FIG. 1 to meet different design requirements of the display panel. For example, when the display panel is used as a vehicle-mounted display screen, based on the display panel designed as shown in FIG. 1, instrument panels can be provided at two sides of the second display region AA2 along the first direction h1 in some embodiments of the present disclosure. The first direction h1 intersects with the second direction h2.

In an embodiment of the present disclosure, the display panel includes multiple sub-pixel rows. One sub-pixel row includes multiple sub-pixels 1 arranged along the first direction h1. The sub-pixel rows are arranged along the second direction h2. In order to describe the embodiments of the present disclosure more clearly, the sub-pixel rows located in the first display region AA1 are named as first sub-pixel rows 11, and the sub-pixel rows located in the second display region AA2 are named as second sub-pixel rows 12. Exemplarily, the sub-pixels 1 in the first sub-pixel row 11 and the second sub-pixel row 12 can have a same structure, and the distance between two adjacent sub-pixels 1 can be the same. As shown in FIG. 1, the number of sub-pixels 1 in the first sub-pixel row 11 is greater than the number of sub-pixels 1 in the second sub-pixel row 12, to match the length design of the first display region AA1 and the second display region AA2 in the first direction h1.

In an embodiment of the present disclosure, the display panel further includes gate lines 2 and data lines 3 that are electrically connected to the sub-pixels 1. As shown in FIG. 1, the gate lines 2 each extend along the first direction h1, and the gates lines 2 are arranged along the second direction h2, and multiple data lines 3 extend along the second direction h2 and arrange along the first direction h1. In order to more clearly describe the embodiments of the present disclosure, the gate line electrically connected to the first sub-pixel row 11 is named a first gate line 21, and the gate line electrically connected to the second sub-pixel row 12 is named a second gate line 22 below. In an embodiment of the present disclosure, as shown in FIG. 1, the length of the second gate line 22 is smaller than the length of the first gate line 21 to match length designs of the first display region AA1 and the second display region AA2 in the first direction h1.

In an embodiment of the present disclosure, the display panel further includes a gate driving circuit and a data driving circuit that are located in the non-display region NA. As shown in FIG. 1, the gate driving circuit includes a plurality of vertical shift registers (VSRs) 400 that are cascaded and one-to-one correspond to the gate lines 2. The data driving circuit (not shown in FIG. 1) is electrically connected to the data line 3.

Figure 2:
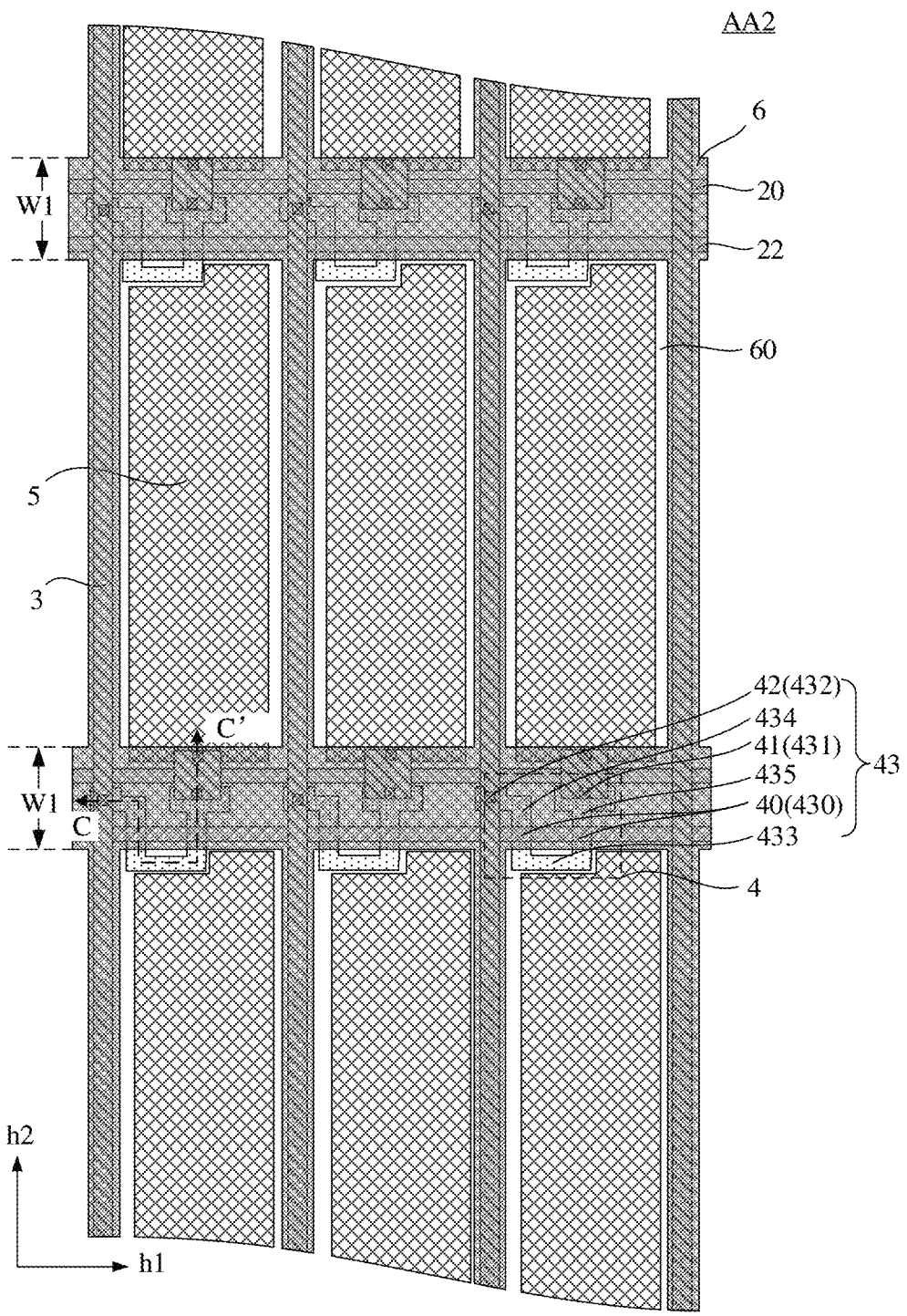
FIG. 2 is an enlarged schematic diagram showing a part of a second display region of a display panel according to another embodiment of the present disclosure.
Figure 3:
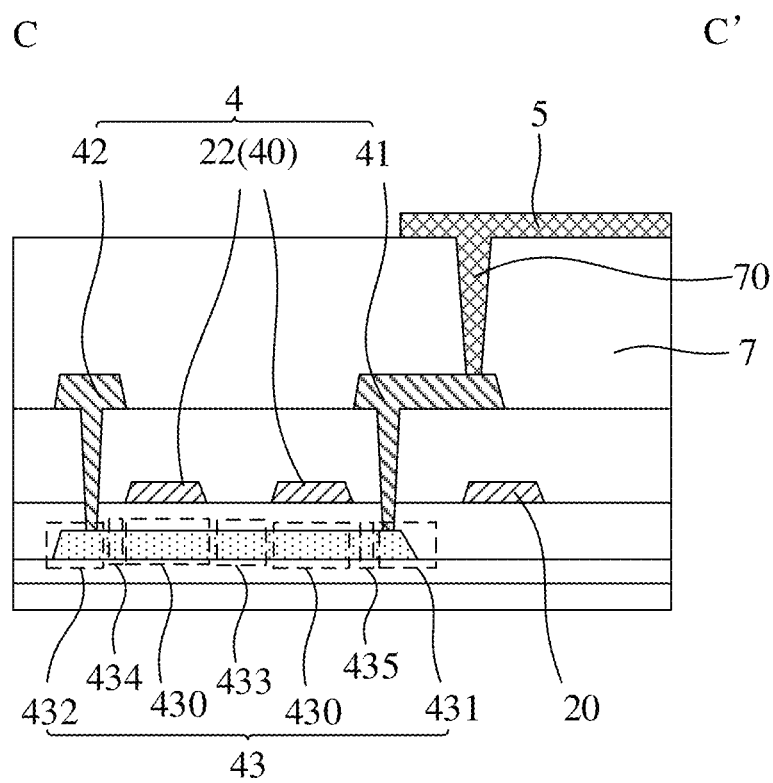
FIG. 3 is a schematic cross-sectional view taken along CC' shown in FIG. 2 according to an embodiment of the present disclosure.

Exemplarily, the display panel provided by the embodiments of the present disclosure may be a liquid crystal display panel. FIG. 2 is an enlarged schematic diagram showing a part of a second display region of a display panel according to another embodiment of the present disclosure, and FIG. 3 is a schematic cross-sectional view taken along CC' shown in FIG. 2 according to an embodiment of the present disclosure. As shown in FIG. 2 and FIG. 3, the sub-pixel 1 includes a liquid crystal layer (not shown), a transistor 4, a pixel electrode 5, and a common electrode (not shown). The transistor 4 includes a control electrode 40, a first electrode 41 and a second electrode 42. In the second display region AA2, the control electrode 40 of the transistor is connected to a second gate line 22, the first electrode 41 of the transistor 4 is electrically connected to the pixel electrode 5, and the second electrode 42 of the transistor 4 is electrically connected to the data line 3.

When the display panel is working, each of the vertical shift registers 400 in the gate driving circuit sequentially outputs an effective level within one frame period. Here, the effective level is a level at which the transistor 4 is turned on. Each of the gate lines 2 sequentially transmits the effective levels provided by the vertical shift registers 400 to the control electrode 40 of the corresponding transistor 4, so that the transistor 4 is turned on to transmit the data signal on the data line 3 to the pixel electrode 5 through the transistor 4 that is turned on. Under a voltage difference between the pixel electrode 5 and the common electrode, the liquid crystals are deflected to modulate light emitted from a backlight source, such that the sub-pixel 1 displays a desired gray scale.

In an embodiment of the present disclosure, as shown in FIG. 1 and FIG. 2, the display panel further includes gate compensation lines 20 electrically connected to the second gate lines 22. The gate compensation line 20 is configured to compensate a load difference between the first gate line 21 and the second gate line 22.

In the embodiments of the present disclosure, when the gate compensation line 20 is provided, as shown in FIG. 1, the gate compensation line 20 and the second gate line 22 are arranged along the second direction h2, and at least a part of the gate compensation line 20 is located between two adjacent sub-pixel rows. Here, at least a part of the gate compensation line 20 being located between two adjacent sub-pixel rows includes following situations: at least a part of the gate compensation line 20 is located between two adjacent first sub-pixel rows 11; at least a part of the gate compensation line 20 is located between two adjacent second sub-pixel rows 12; and at least a part of the gate compensation lines 20 is located between the first sub-pixel row 11 and the second sub-pixel row 12 that are adjacent to each other. The location of the gate compensation line 20 will be described below.

In an embodiment of the present disclosure, as shown in FIG. 1 and FIG. 2, the gate compensation line 20 and the second gate line 22 that are connected to each other are electrically connected to a same second sub-pixel row 12. Moreover, the gate compensation line 20 and the second gate line 22 that are connected to each other are connected to a same output terminal of a same vertical shift register 400, to receive a same gate driving signal. When the display panel displays, the gate compensation line 20 and the second gate line 22 that are connected to each other are configured to control charging of a same second sub-pixel row 12. With such a configuration, the vertical shift register 400 connected to the second gate line 22 can have the same structure as the vertical shift register 400 connected to the first gate line 21, that is, there is no need to specially design the structure of the vertical shift register 400 connected to the second gate line 22, thereby avoiding the complexity of the vertical shift register 400.

In the display panel provided by the embodiments of the present disclosure, by providing the gate compensation lines 20 connected to the second gate lines 22, the gate compensation line 20 can compensate a load difference between the first gate line 21 and the second gate line 22 due to the length difference between the first gate line 21 and the second gate line 22, so that the delay differences of the gate driving signal on the first gate line 21 and the second gate line 22 tend to be consistent, thereby alleviating the display unevenness of the first sub-pixel row 11 and the second sub-pixel row 12 that are connected to the first gate line 21 and the second gate line 22 due to the difference in charging, and thus improving the display uniformity of the display panel.

Figure 4:
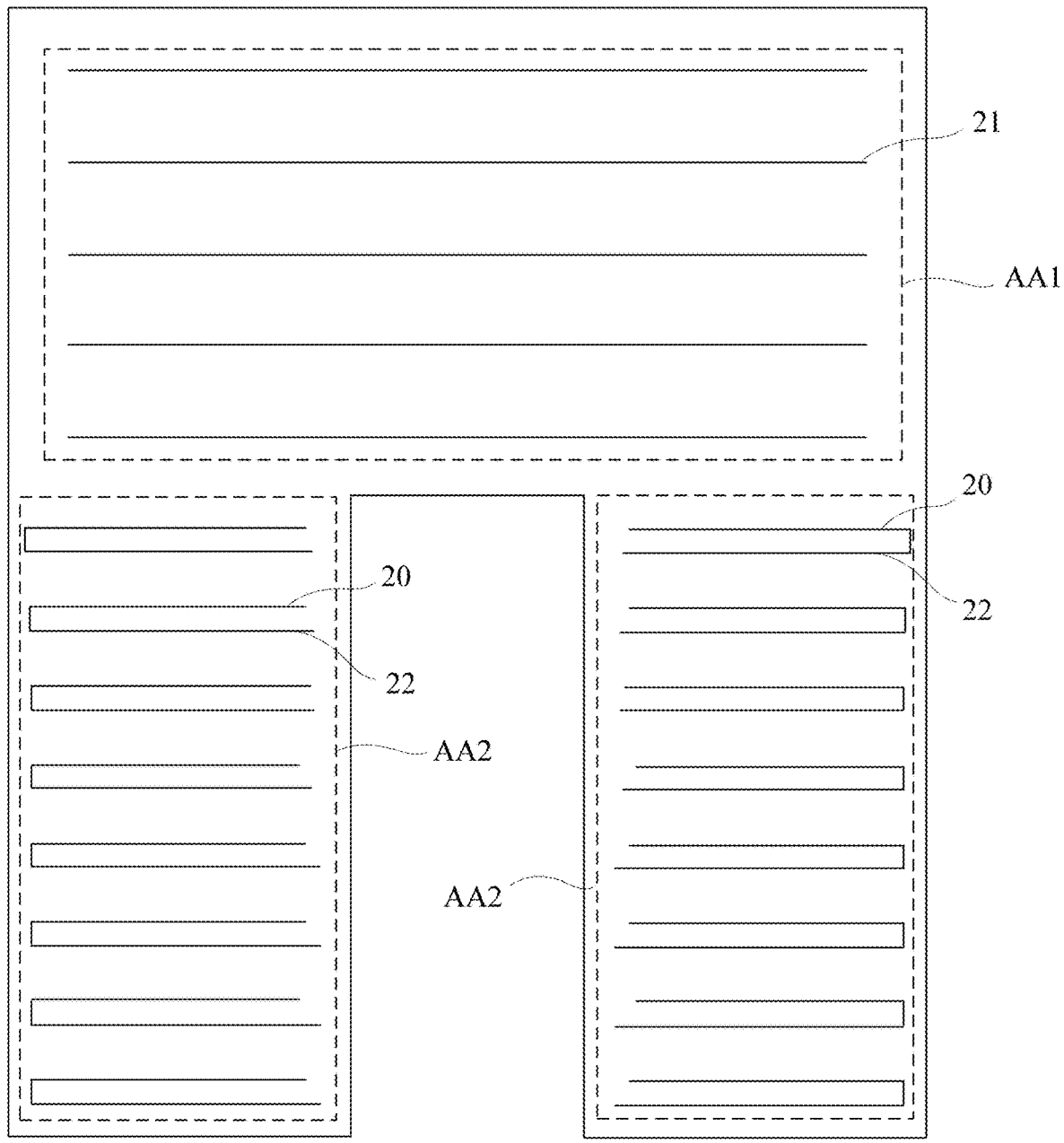
FIG. 4 is a schematic diagram showing a display panel according to another embodiment of the present disclosure.

It should be noted that the positions and numbers of the first display region AA1 and the second display region AA2 shown in FIG. 1 are merely illustrative. In the embodiments of the present disclosure, multiple first display regions AA1 and/or multiple second display regions AA2 may be provided. The numbers and positional relationship of the first display region AA1 and the second display region AA2 can be determined according to different design requirements of the display panel and specific application scenarios of the display panel, which are not limited in the embodiments of the present disclosure. FIG. 4 is a schematic diagram showing a display panel according to another embodiment of the present disclosure. For example, as shown in FIG. 4, in an embodiment of the present disclosure, the number of the first display region AA1 may be one, and the number of the second display region AA2 may be two. Exemplarily, as shown in FIG. 4, in an embodiment of the present disclosure, two second display regions AA2 may be located at a same side of the first display region AA1.

In an embodiment of the present disclosure, for example, as shown in FIG. 2, the display panel further includes a black matrix 6. In the second display region AA2, an orthographic projection of the black matrix 6 on a plane of the display panel covers the second gate lines 22, the gate compensation lines 20 and the data lines 3, so that light leakage can be prevented at the positions of the second gate lines 22, the gate compensation lines 20 and the data lines 3, reducing the visibility of the second gate lines 22, the gate compensation lines 20 and the data lines 3. As shown in FIG. 2, the black matrix 6 includes multiple openings 60. Along a direction perpendicular to the plane of the display panel, the opening 60 at least partially overlaps with the pixel electrode 5.

As shown in FIGS. 2 and 3, the transistor 4 includes an active layer 43, and the active layer 43 includes a first doping region 430 and at least two second doping regions. In FIG. 2 and FIG. 3, two second doping regions are labeled as 431 and 432, respectively. In an embodiment of the present disclosure, the first doping region and the second doping region may be doped with different materials. Taking formation of an N-type thin film transistor as an example, the first doping region 430 may be doped with boron, and the second doping region may be doped with phosphorus. The first doping region 430 is located between the second doping region 431 and the second doping region 432.

The first doping region 430 overlaps with the control electrode 40 of the transistor 4 in a direction perpendicular to the plane of the display panel. The first doping region 430 may form a channel.

One second doping region 431 of the active layer 43 is electrically connected to the first electrode 41 of the transistor 4. One second doping region 432 of the active layer 43 is electrically connected to the second electrode 42 of the transistor 4. The second doping region can be formed with a heavily doping process to improve the conductivity of the second doping region.

Exemplarily, in the embodiments of the present disclosure, the control electrode 40 of the transistor 4, the second gate line 22 and the gate compensation line 20 can be arranged in a same layer; and/or, the first electrode 41 of the transistor 4, the second electrode 42 of the transistor 4 and the data line 3 may be arranged in a same layer, to simplify a manufacturing process of the display panel. Moreover, since the gate compensation line 20 and the second gate line 22 transmit a same signal, the embodiments of the present disclosure can avoid arranging the gate compensation line 20 at the other layer than the layer of the second gate line 22 by arranging the gate compensation line 20 and the second gate line 22 in a same layer, so that the possibility of short circuit between the gate compensation line 20 and the traces that transmit other signals can be reduced, thereby achieving the reliability of the display panel.

It should be noted that when the gate compensation line 20 and the second gate line 22 are arranged in a same layer and connected to each other, the gate compensation line 20 and the second gate line 22 can be regarded as a whole, and there is no boundary between the gate compensation line 20 and the second gate line 22.

Figure 5:
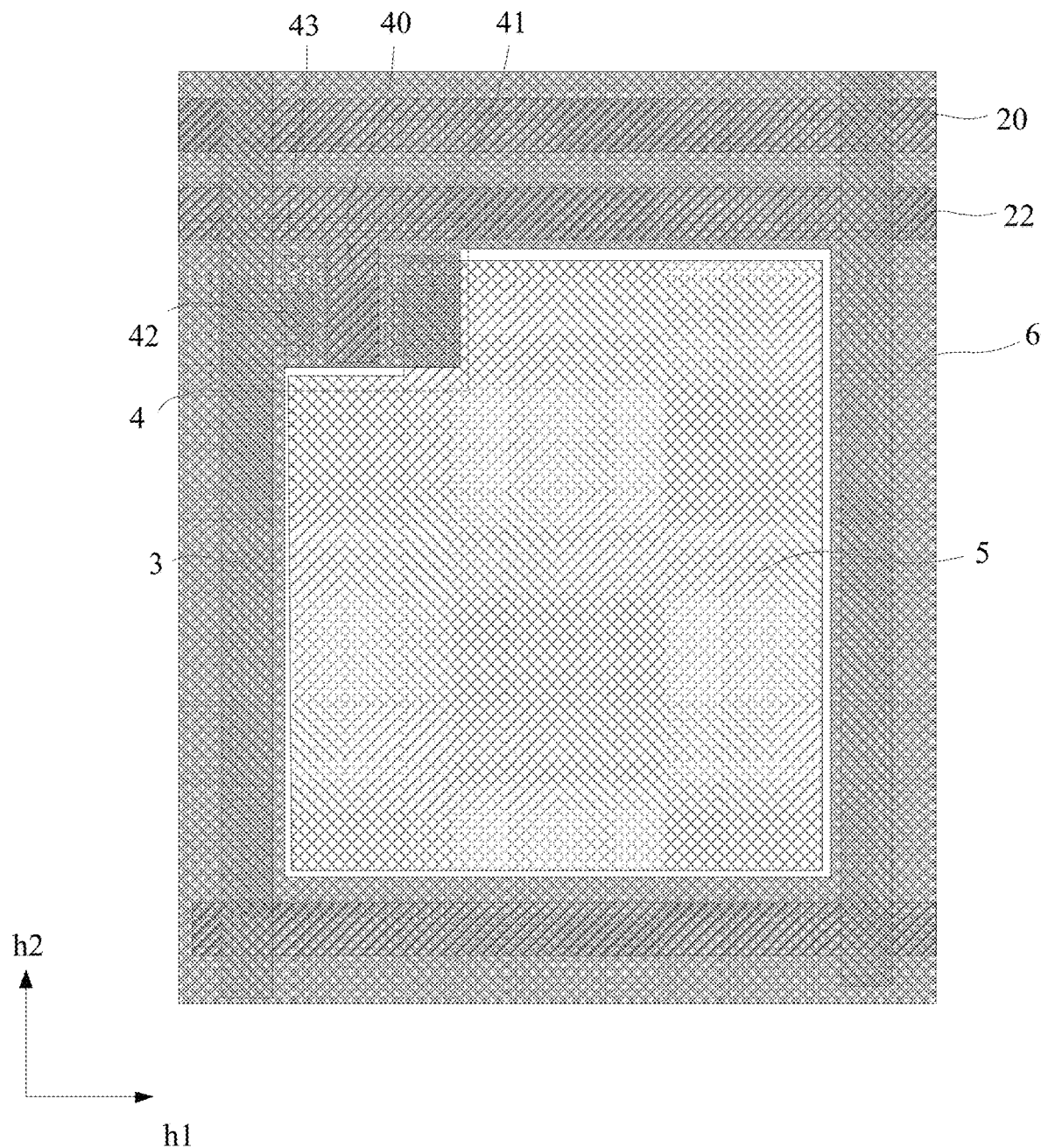
FIG. 5 is an enlarged schematic diagram showing a display panel according to another embodiment of the present disclosure.

In the embodiments of the present disclosure, when the second gate line 22 is provided, as shown in FIG. 2, an orthographic projection of the second gate line 22 on the plane of the display panel can overlap with an orthographic projection of the first doping region 430 on the plane of the display panel. With such a configuration, the overlapping portion between the second gate line 22 and the first doping region 430 can be reused as the control electrode 40 of the transistor 4. In this situation, as shown in FIG. 2, in an embodiment of the present disclosure, the shape of the second gate line 22 may be designed as a straight line extending along the first direction h1. FIG. 5 is an enlarged schematic diagram showing a display panel according to another embodiment of the present disclosure. As shown in FIG. 5, the control electrode 40 of the transistor 4 is formed as a convex structure extending from the second gate line 22 toward the active layer 43. In FIG. 5, in order to avoid light leakage at the position of the control electrode 40 which can cause the control electrode 40 to be observed by human eyes, the black matrix 6 covers the control electrode 40, the second gate line 22, the gate compensation line 20 and the data line 3. That is, based on the configuration as shown in FIG. 5, the width of the black matrix 6 needs to be set larger to achieve covering the gate electrode 40 by the black matrix 6. Therefore, in the embodiments of the present disclosure, the orthographic projection of the second gate line 22 on the plane of the display panel overlaps with the orthographic projection of the first doping region 430 on the plane of the display panel, so that the overlapping portion between the second gate line 22 and the first doping region 430 can be reused as the control electrode 40 of the transistor 4, thereby reducing the width of the black matrix 6 and increasing the aperture ratio of pixels.

Exemplarily, as shown in FIG. 2 and FIG. 3, in the embodiments of the present disclosure, at least two overlapping positions between the first doping region 430 and the second gate line 22 may be provided, and the overlapping positions between the first doping region 430 and the second gate line 22 form channels. With such a configuration, the leakage current of the transistor 4 can be reduced compared with a structure of forming a single channel in the transistor 4, so that when the pixel electrode 5 is charged, the stability of the voltage on the pixel electrode 5 can be achieved, thereby avoiding flicker of display images.

In an embodiment of the present disclosure, as shown in FIG. 2, the shape of the orthographic projection of the active layer 43 on the plane of the display panel may include multiple bending structures in which at least two first doping regions 430 are provided. Two first doping regions 430 overlap with the second gate line 22 to form at least two channels in the transistor 4. As shown in FIG. 2, the active layer 43 can have a U-shaped structure. It should be noted that, providing that the transistor has a small leakage current, the active layer 43 can be designed in other shapes in the embodiments of the present disclosure, which are not limited in the embodiments of the present disclosure.

In an embodiment of the present disclosure, as shown in FIG. 3, when at least two channels are formed in the transistor 4, a second doping region (indicated by 433 in FIG. 3) that is heavily doped can be provided between two first doping regions 430 corresponding to two channels, so that the conductivity of the second doping region 433 can be increased, thereby facilitating signal transmission between two adjacent channels.

In an embodiment of the present disclosure, in the structure shown in FIG. 2, low temperature poly-silicon (LTPS) is used for forming the active layer 43, thereby improving the carrier mobility of the transistor 4 and the response speed of the display panel.

Exemplarily, when the gate compensation line 20 is provided, as shown in FIG. 2, in the embodiments of the present disclosure, the orthographic projection of the gate compensation line 20 on the plane of the display panel may not overlap with the orthographic projection of the first doping region 430 on the plane of the display panel; and/or the orthographic projection of the gate compensation line 20 on the plane of the display panel may not overlap with the orthographic projection of the second doping region 431 on the plane of the display panel; and/or, the orthographic projection of the gate compensation line 20 on the plane of the display panel may not overlap with the orthographic projection of the second doping region 432 on the plane of the display panel; and/or, the orthographic projection of the gate compensation line 20 on the plane of the display panel may not overlap with the orthographic projection of the second doping region 433 on the plane of the display panel.

In the embodiments of the present disclosure, the gate compensation line 20 is arranged to not overlap with the first doping region 430, so that the carriers in the first doping region 430 are not affected by signals on the gate compensation line 20, thus a turn-on current of the transistor 4 will not be decreased. If the turn-on current of the transistor 4 becomes smaller, charging time required for the voltage of the pixel electrode 5 to rise to a target voltage will become longer when the data line 3 charges for the pixel electrode 5 through the transistor 4. If the turn-on time allocated to the second gate line 22 is constant, the pixel electrode 5 may be under-charged. Therefore, according to this embodiment of the present disclosure, the second sub-pixel rows 12 electrically connected to the gate compensation lines 20 can achieve an ideal charging effect.

Exemplarily, as shown in FIG. 3, the second doping region 431 of the active layer 43 is electrically connected to the first electrode 41 of the transistor 4. The first electrode 41 of the transistor 4 is electrically connected to the pixel electrode 5. In an embodiment of the present disclosure, the pixel electrode 5 may be made of a transparent metal oxide, such as indium tin oxide or indium zinc oxide. An insulation layer 7 may be provided between the first electrode 41 of the transistor 4 and the pixel electrode 5. The insulation layer 7 includes a through-hole 70. The first electrode 41 of the transistor 4 may be electrically connected to the pixel electrode 5 via the through-hole 70. The second doping region 432 of the active layer 43 is electrically connected to the second electrode 42 of the transistor 4. The second electrode 42 of the transistor 4 is electrically connected to the data line 3.

When the display panel is working, the gate compensation line 20 and the second gate line 22 connected thereto transmit a same signal, and the second doping region 431 and the second doping region 432 transmit data signals. In the embodiments of the present disclosure, the gate compensation line 20 is arranged to not overlap with the second doping region 431, and/or the gate compensation line 20 is arranged to not overlap with the second doping region 432, so that the coupling capacitance between the gate compensation line 20 and the portion of the active layer 43 located in the second doping region 431 can be reduced, and/or coupling capacitance between the gate compensation line 20 and the portion of the active layer 43 located in the second doping region 432 can be reduced. With such a configuration, the mutual interference between the gate driving signal and the data driving signal can be reduced, so that the gate driving signal and the data driving signal can be better maintained at the required target signals.

In the embodiments of the present disclosure, the gate compensation line 20 is arranged to not overlap with the second doping region 433, so that the coupling capacitance between the gate compensation line 20 and the second doping region 433 can be reduced. If the coupling capacitance between the gate compensation line 20 and the second doping region 433 is too large, the signal in the second doping region 433 will be greatly affected when the signal on the gate compensation line 20 changes, as a result, the signal of the first doping region 430 communicating with the second doping region 433 may be affected, that is, the conduction current of the channel may be greatly affected, to affect charging of the sub-pixels. With such a configuration according to the embodiments of the present disclosure, normal charging of the sub-pixels can be achieved.

In the embodiments of the present disclosure, the active layer 43 further includes at least two third doping regions. The third doping region and the second doping region are doped with a same material, and has a doping concentration of the third doping region is smaller than that of the second doping region. The electrical conductivity of the third doping region is smaller than the electrical conductivity of the second doping region, and is greater than the electrical conductivity of the first doping region. Exemplarily, as shown in FIG. 2 and FIG. 3, the active layer 43 includes two third doping regions 434 and 435. The third doping region 434 is located between the first doping region 430 and the second doping region 432. The third doping region 435 is located between the first doping region 430 and the second doping region 431. The third doping region can be formed by a lightly doping process to make the conductivity of the third doping region be within a range between the conductivity of the first doping region and the conductivity of the second doping region. That is, the third doping region is used as a transition region, so that normal transmission of the signal is not affected by an abrupt change of resistance when the signal is transmitted between the first doping region and the second doping region.

Exemplarily, in the embodiments of the present disclosure, when the gate compensation line 20 is provided, the orthographic projection of the gate compensation line 20 on the plane of the display panel does not overlap with the orthographic projection of the at least one third doping region on the plane of the display panel. As shown in FIG. 2 and FIG. 3, the gate compensation line 20 does not overlap with the third doping region 434 and the third doping region 435. With such a configuration, the coupling capacitance between the gate compensation line 20 and the third doping region can be reduced. If the coupling capacitance between the gate compensation line 20 and the third doping region is too large, the signal of the third doping region may be greatly affected when the signal on the gate compensation line 20 changes, as a result, the signal of the first doping region communicating with the third doping region may be affected, that is, the conduction current of the channel may be greatly affected, to affect charging of the sub-pixels. With such a configuration according to the embodiments of the present disclosure, normal charging of the sub-pixels can be achieved.

As shown in FIG. 2 and FIG. 3, in the embodiments of the present disclosure, the gate compensation line 20 does not overlap with the active layer 43. That is, the gate compensation line 20 does not overlap with the first doping region, the second doping region, and the third doping region.

Exemplarily, all of the control electrode 40, the first electrode 41, and the second electrode 42 of the transistor 4 may be formed of metal materials. In an embodiment of the present disclosure, the orthographic projection of the black matrix 6 on the plane of the display panel further covers the control electrode 40, the first electrode 41 and the second electrode 42 of the transistor 4.

As shown in FIG. 2, in an embodiment of the present disclosure, for the gate compensation line 20 and the second gate line 22 that are connected to a same pixel, the gate compensation line 20 may be located at a side of the second gate line 22 close to the pixel electrode 5 of the pixel. As shown in FIG. 2, the black matrix 6 has a width W1 between two adjacent sub-pixel rows. Compared with a situation where the gate compensation line 20 is provided at a side of the second gate line 22 away from the pixel electrode 5, in order to guarantee that the black matrix 6 can shield the control electrode 40, the first electrode 41 and the second electrode 42 of the transistor 4, and shield the second gate lines 22 and the gate compensation lines 20, the arrangement manner shown in FIG. 2 may be adopted to achieve a small width W1 of the black matrix 6 located between two adjacent sub-pixel rows, thereby increasing the aperture ratio of pixels.

It should be noted that, compared with metal, the active layer 43 has a higher light transmittance. Therefore, based on the arrangement manner shown in FIG. 2, in an embodiment of the present disclosure, at least a part of the active layer 43 may be exposed to outside of the black matrix 6, and the display effect of the display panel can still be achieved.

Figure 6:
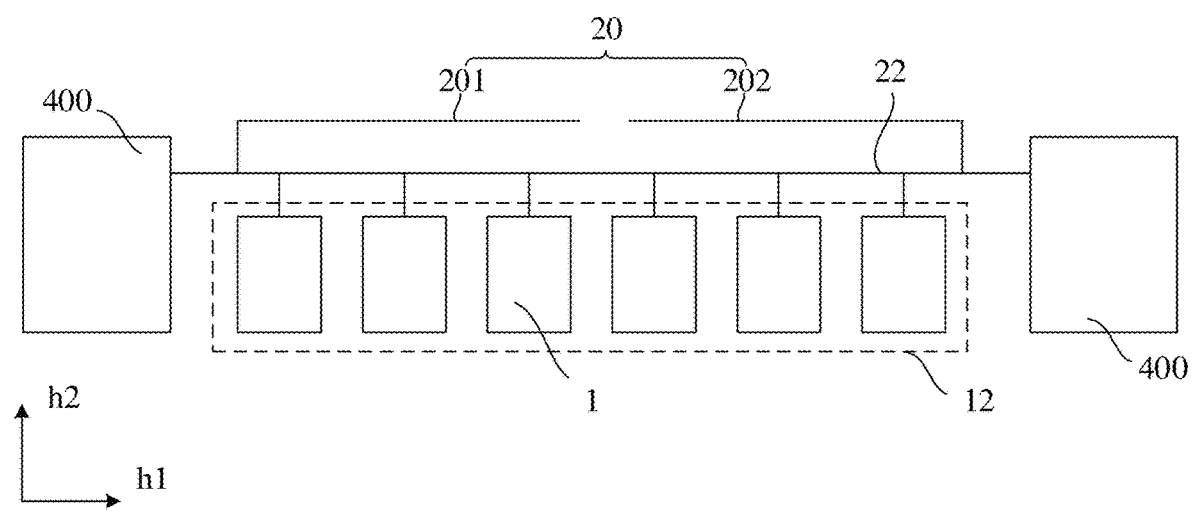
FIG. 6 is an enlarged schematic diagram showing a second display region of a display panel according to another embodiment of the present disclosure.

FIG. 6 is an enlarged schematic diagram showing a second display region of a display panel according to another embodiment of the present disclosure. Exemplarily, as shown in FIG. 6, in an embodiment of the present disclosure, the gate compensation line 20 includes a first gate compensation sub-line 201 and a second gate compensation sub-line 202. The first gate compensation sub-line 201 is electrically connected to a first end of the second gate line 22, and the second gate compensation sub-line 202 is electrically connected to a second end of second gate line 22. The first gate compensation sub-line 201 at least partially overlaps with the second gate compensation sub-line 202 in the first direction h1. There is a space formed between the first gate compensation sub-line 201 and the second gate compensation sub-line 202 in the first direction h1. In an embodiment of the present disclosure, the length of the first gate compensation sub-line 201 is smaller than the length of the second gate line 22, and the length of the second gate compensation sub-line 202 is smaller than the length of the second gate line 22.

Exemplarily, as shown in FIG. 6, in an embodiment of the present disclosure, the display panel may be designed to be driven bilaterally, that is, both sides of the second gate line 22a is provided with a respective vertical shift register 400 electrically connected to the second gate line 22. With such a configuration, the gate driving signal can be bi-directionally loaded on the second gate line 22, so that the signal delay degree of the gate driving signal in the transmission process can be alleviated, thereby better achieving the charging effect of multiple sub-pixels 1 in the second sub-pixel row 12 electrically connected to the second gate line 22. Moreover, when the second gate line 22 is connected to the gate compensation line 20, an overall resistance of the second gate line 22 and the gate compensation line 20 will become larger. In the embodiments of the present disclosure, the second gate line 22 are bi-directionally driven, so that the load difference caused by the different lengths of the first gate line 21 and the second gate line 22 can be compensated, and the charging effects of multiple sub-pixels 1 in the second sub-pixel row 12 electrically connected to the second gate line 22 can tend to be consistent.

In an embodiment of the present disclosure, both sides of the first gate line 21 is provided with a respective vertical shift register 400 electrically connected to the first gate line 21, so that the gate driving signals can be bi-directionally loaded on the first gate line 21, the signal delay degree of the gate driving signal in the transmission process can be alleviated, thereby achieving the charging effect of multiple sub-pixels 1 in the first sub-pixel row 11 electrically connected to the first gate line 21.

Moreover, in the embodiments of the present disclosure, the first gate compensation sub-line 201 overlaps with the second gate compensation sub-line 202 in the first direction h1, so that the space width occupied by the first gate compensation sub-line 201 and the second gate compensation sub-line 202 in the second direction h2 can be reduced, which is advantageous to guaranteeing the aperture ratio of pixels.

When the length difference between the first display region AA1 and the second display region AA2 in the first direction h1 is relatively small, the load difference between the first gate line 21 and the second gate line 22 is relatively small, and in order to compensate for the load difference between the first gate line 21 and the second gate line 22, the length of the gate compensation line 20 can be set to be shorter. For example, when B1<A1≤2B1, as shown in FIG. 1, in an embodiment of the present disclosure, the gate compensation line 20 may be arranged in the second display region AA2.

In an embodiment of the present disclosure, the gate compensation line 20 may be provided close to the second gate line 22 electrically connected thereto. In other words, for the gate compensation line 20 and the second gate line 22 that are connected to each other, as shown in FIG. 1, the gate compensation line 20 and the second gate line 22 can be provided between two adjacent second sub-pixel rows 12. With such a configuration, setting other traces between the gate compensation line 20 and the second gate line 22 can be avoided, thereby alleviating the coupling interference between the gate driving signal and other signals.

Figure 7:
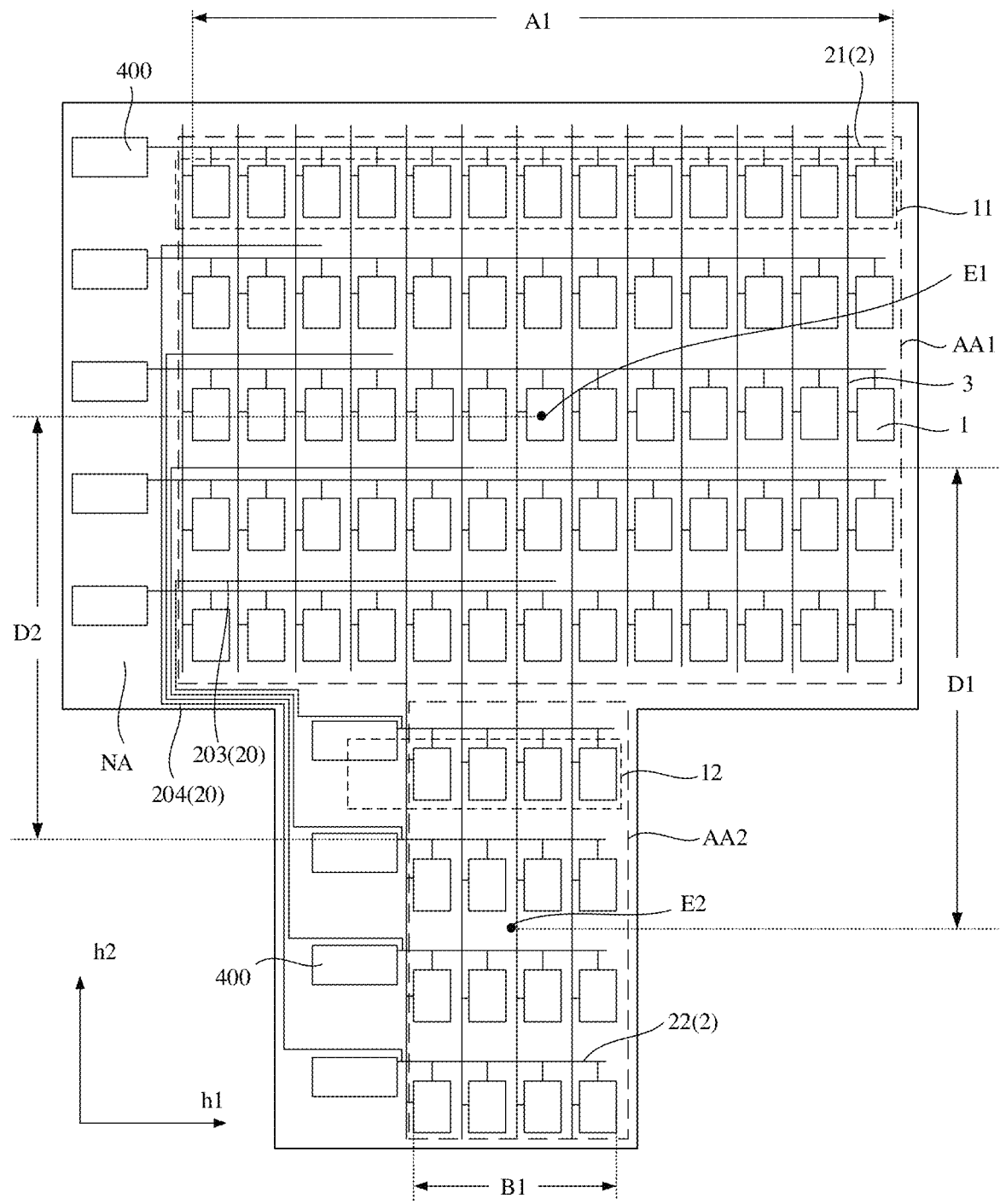
FIG. 7 is a schematic diagram showing a display panel according to another embodiment of the present disclosure.

When the length difference between the first display region AA1 and the second display region AA2 is relatively large, the load difference between the first gate line 21 and the second gate line 22 is relatively large, and in order to compensate for the load difference between the first gate line 21 and the second gate line 22, the length of the gate compensation line 20 can be set to be longer. FIG. 7 is a schematic diagram showing a display panel according to another embodiment of the present disclosure. For example, when A1>2B1, as shown in FIG. 7, in an embodiment of the present disclosure, at least a part of the gate compensation line 20 may be located in the first display region. AA1.

Exemplarily, as shown in FIG. 7, in the embodiments of the present disclosure, the gate compensation line 20 may at least include a third gate compensation sub-line 203 and a fourth gate compensation sub-line 204. The third gate compensation sub-line 203 is located in the first display region AA1, and at least a part of the fourth gate compensation sub-line 204 is located in the non-display region NA. The third gate compensation sub-line 203 is electrically connected to the second gate line 22 through the fourth gate compensation sub-line 204. Exemplarily, as shown in FIG. 7, the third gate compensation sub-line 203 may be located between two adjacent first sub-pixel rows 11.

Figure 8:
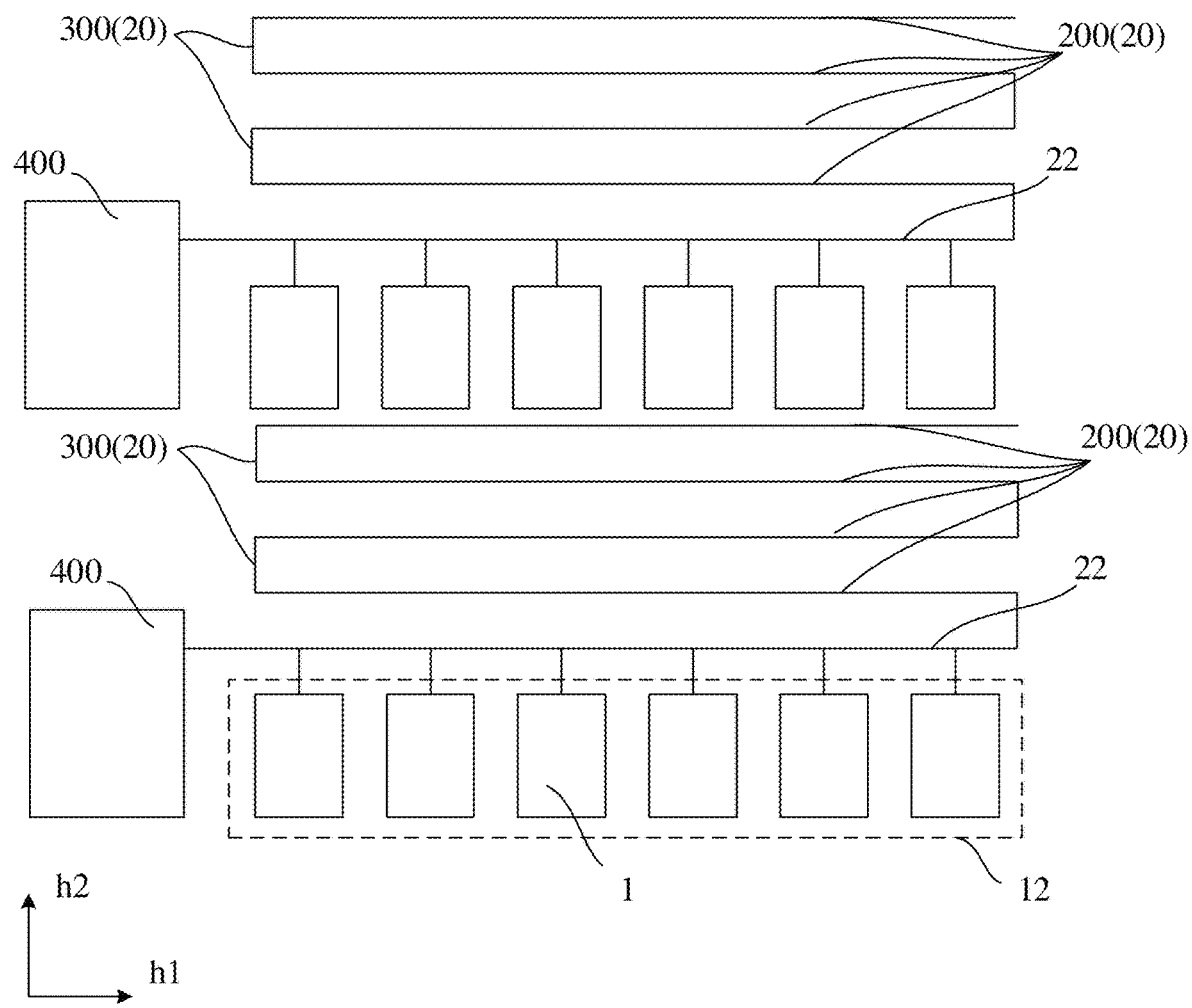
FIG. 8 is an enlarged schematic diagram showing a second display region of a display panel according to another embodiment of the present disclosure.

As shown in FIG. 7, in the embodiments of the present disclosure, the third gate compensation sub-line 203 extends along the first direction h1. When A1>2B1, in order to make the loads of the first gate line 21 and the second gate line 22 be consistent, the length of the gate compensation line 20 electrically connected to the second gate line 22 can be set to be longer. If all of the gate compensation lines 20 are arranged in the second display region AA2, since the length of the second display region AA2 in the first direction h1 is relatively short, in order to achieve the required length of the gate compensation line 20, the gate compensation line 20 electrically connected to the same second gate line 22 is designed to include multiple line segments extending along the first direction h1. FIG. 8 is an enlarged schematic diagram showing a second display region of a display panel according to another embodiment of the present disclosure. As shown in FIG. 8, the gate compensation line 20 electrically connected to the second gate line 22 is entirely located in the second display region AA2, in order to make the load of the second gate line 22 after compensation be consistent with the load of the first gate line, the gate compensation line 20 electrically connected to a same second gate line 22 needs to be bent several times between two adjacent second sub-pixel rows 12 to reach the desired length. As shown in FIG. 8, the gate compensation line 20 includes multiple first line segments 200 extending along the first direction h1. A second line segment 300 extending along the second direction h2 is provided between two adjacent line segments 200. It can be seen that, based on the arrangement manner shown in FIG. 8, the distance between two adjacent second sub-pixel rows 12 along the second direction h2 needs to be set larger to accommodate the gate compensation line 20 including multiple first line segments 200 and multiple second line segments 300, and this is disadvantageous to increasing the aperture ratio of pixels.

In the embodiments of the present disclosure, at least a part of the gate compensation line 20 is provided in the first display region AA1, at most two line segments each extending along the first direction h1 can be arranged between two adjacent sub-pixel rows of the display panel. One of the two line segments is the gate line 2 (including the first gate line 21 or the second gate line 22), and the other of two line segments is the gate compensation line 20. With such a configuration, the width between two adjacent sub-pixel rows is set to be as narrow as possible, thereby guaranteeing the aperture ratio of pixels.

Exemplarily, the lengths of the third gate compensation sub-line 203 and the fourth gate compensation sub-line 204 can be set according to the length difference between the first gate line 21 and the second gate line 22. The specific lengths of the third gate compensation sub-line 203 and the fourth gate compensation sub-line 204 are not limited in the embodiments of the present disclosure.

Exemplarily, in an embodiment of the present disclosure, the second display region AA2 is provided with multiple second sub-pixel rows 12 and multiple second gate lines 22, and all of the multiple second gate lines 22 can be compensated, that is, multiple gate compensation lines 20, which are connected to the multiple second gate lines 22 in one-to-one correspondence, are provided. As shown in FIG. 7, when multiple gate compensation lines 20 are provided in the display panel to compensate for multiple second gate lines 22, a first distance D1 between the second display region AA2 and the gate compensation line 20 located in the first display region AA1 is in direct proportion to a second distance D2 between the first display region AA1 and the second gate line 22 connected to the gate compensation line 20. The first distance D1 refers to a shortest distance between a geometric center E2 of the second display region AA2 and the gate compensation line 20, and the second distance D2 refers to a shortest distance between a geometric center E1 of the first display region AA1 and the second gate line 22. With such a configuration, as shown in FIG. 7, when multiple gate compensation lines 20 located in the first display region AA1 are provided to compensate for the load difference between the first gate line 21 and the second gate line 22, multiple gate compensation lines 20 can be arranged in a same layer, and multiple gate compensation lines 20 can be prevented from intersecting with each other, thereby reducing the coupling capacitance between different gate compensation lines 20.

Figure 9:
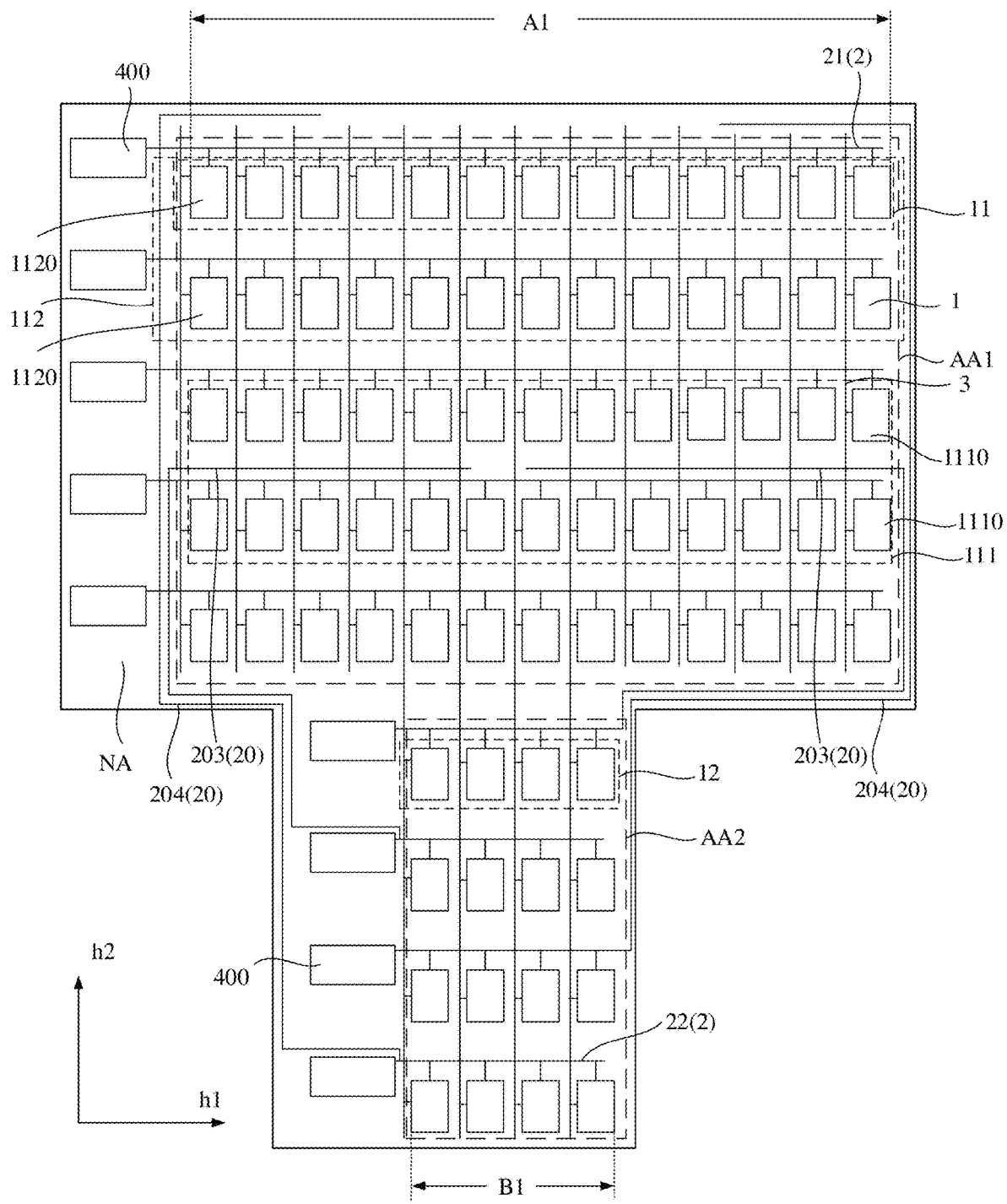
FIG. 9 is a schematic diagram showing a display panel according to another embodiment of the present disclosure.

It should be noted that the relative positional relationship of the multiple gate compensation lines 20 shown in FIG. 7 is merely for illustration. FIG. 9 is a schematic diagram showing a display panel according to another embodiment of the present disclosure. As shown in FIG. 9, for two gate compensation lines 20 electrically connected to two different second gate lines 22, when at least a part of each of the two gate compensation lines 20 is located in the first display region AA1, the third gate compensation sub-lines 203 of the two gate compensation lines at least partially overlap in the first direction h1 in the embodiments of the present disclosure.

As shown in FIG. 9, the first sub-pixel rows 11 in the first display region AA1 includes a first group 111 and a second group 112. The first group 111 includes two adjacent first-type first sub-pixel rows 1110. Two third gate compensation sub-lines 203 are provided between the two adjacent two first-type first sub-pixel rows 1110, and are electrically connected to two different second gate lines 22 through two fourth gate compensation sub-lines 204, respectively. The two fourth gate compensation sub-lines 204 may be arranged along the first direction h1 and separated by the first display region AA1 or the second display region AA2. The second group 112 includes two adjacent second-type first sub-pixel rows 1120. Only the first gate line 21 is provided between the two adjacent second-type first sub-pixel rows 1120, and the third gate compensation sub-line 203 is not provided between the two adjacent second-type first sub-pixel rows 1120. Since the width of the black matrix at the position where the gate compensation line is provided is relatively large, the arrangement manner shown in FIG. 9 can obtain a relatively narrow width of the black matrix between the two adjacent second-type first sub-pixel rows 1120 in the second group 112. That is, the aperture ratio of the sub-pixels in the second-type first sub-pixel row 1120 can be guaranteed.

Figure 10:
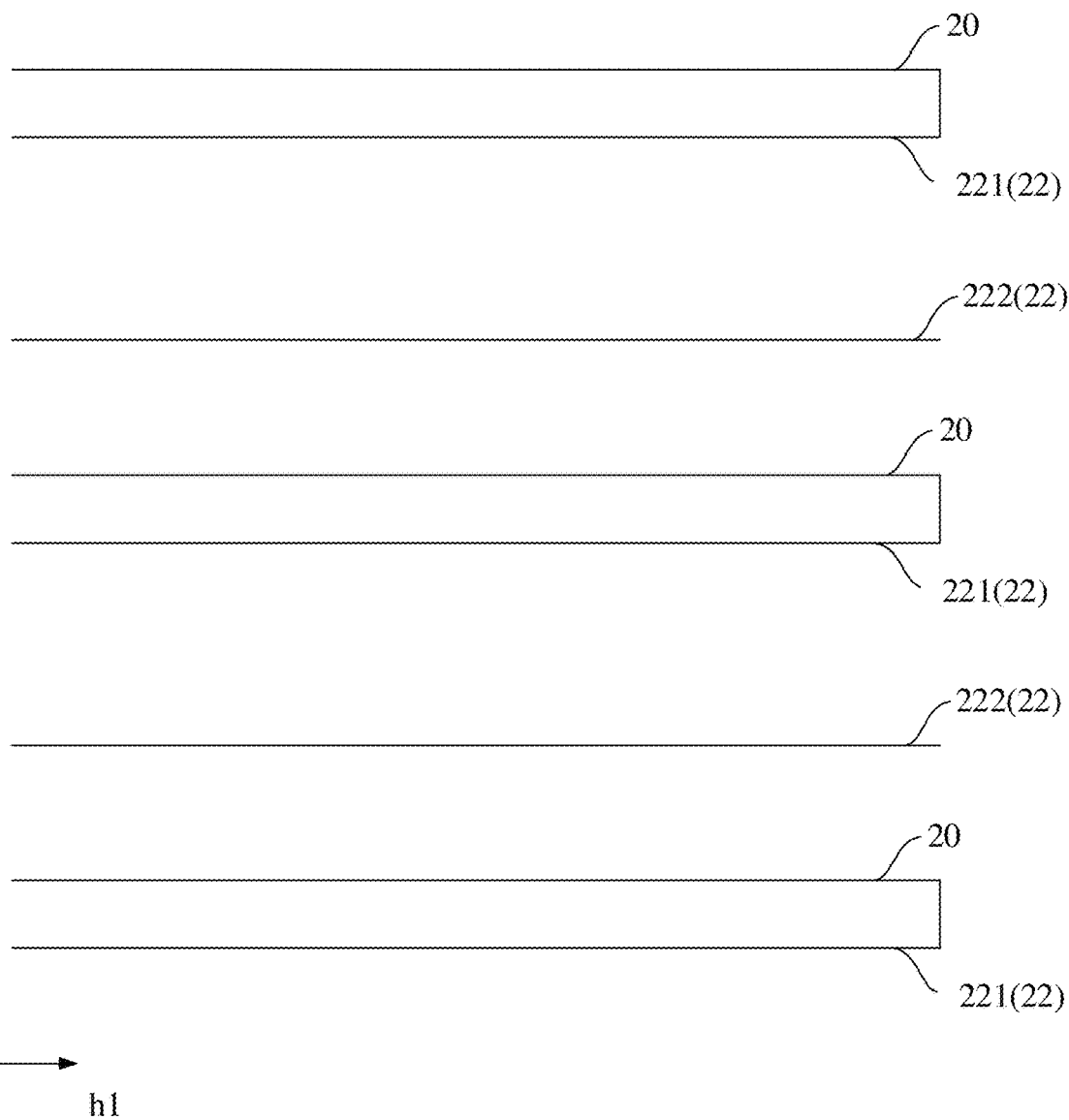
FIG. 10 is a schematic diagram showing a second display region of a display panel according to another embodiment of the present disclosure.

FIG. 10 is a schematic diagram showing a second display region of a display panel according to another embodiment of the present disclosure. As shown in FIG. 10, the multiple second gate lines 22 include first-type second gate lines 221 and second-type second gate lines 222. The first type second gate line 221 is connected to the gate compensation line 20, and the second type second gate line 222 is not connected to the gate compensation line 20. In an embodiment of the present disclosure, the first-type second gate lines 221 and the second-type second gate lines 222 are alternately arranged along the second direction h2. Since the length of one sub-pixel in the second direction h2 is less than the minimum length that can be distinguished by the human eye, with such a configuration, a brightness difference will be observed by human eyes when the second type of sub-pixel row is not connected to the gate compensation line. Moreover, such a configuration can avoid increasing the loads of all second gate lines 22, thereby reducing the power consumption of the display panel.

It should be noted that the arrangement of all gate compensation lines 20 in the second display region AA2 as shown in FIG. 10 is merely for illustration. In the embodiments of the disclosure, at least a part of the gate compensation line 20 can also be provided in the first display region AA1 in a case that there is a great length difference between the first gate line 21 and the second gate line 22. When at least a part of the gate compensation line 20 is arranged in the first display region AA1, the specific arrangement can refer to the foregoing description, which will not be elaborated herein.

In an embodiment of the present disclosure, when multiple second gate lines 22 have a same length, as shown in FIG. 1, in the embodiments of the present disclosure, a respective gate compensation line 20 may be provided for each second gate line 22, and the gate compensation lines 20 have a same length.

Figure 11:
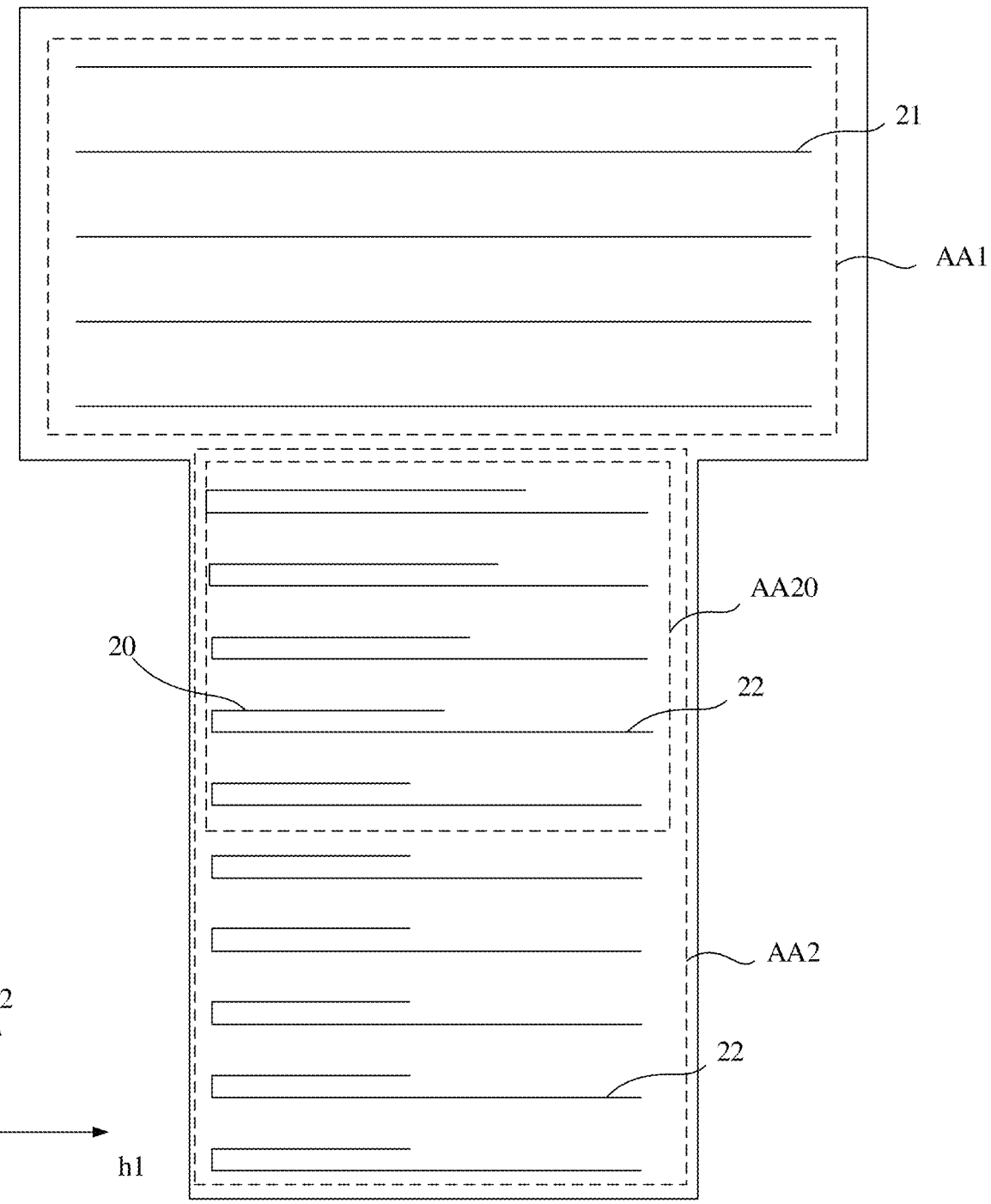
FIG. 11 is an enlarged schematic diagram showing a display panel according to another embodiment of the present disclosure.

FIG. 11 is an enlarged schematic diagram showing a display panel according to another embodiment of the present disclosure. As shown in FIG. 11, the second display region AA2 includes a first transition region AA20, and the length of the first transition region AA20 in the second direction h2 is smaller than or equal to the length of the second display region AA2. The first transition region AA20 is adjacent to the first display region AA1.

When the multiple second gate lines 22 in the first transition region AA20 have a same length, in the first transition region AA20, the gate compensation line 20 can have a gradually increasing length along a direction from the second display region AA2 to the first display region AA1 in the embodiments of the present disclosure, so that a total load of the gate compensation line 20 closest to the first display region AA1 in the second display region AA2 and the second gate line 22 connected thereto has the smallest difference from a total load of the first gate line 21 in the second display region AA2, and a total load of the second gate line 22 connected to a respective second sub-pixel row 12 in the second display region AA2 after compensation gradually increases with the increasing distance between the second gate line 22 and the first display region AA1. With such a configuration, the brightness of the sub-pixels located at the junction position between the first display region AA1 and the second display region AA2 can have a gradient with a small change range, so that the human eye cannot easily observe the brightness difference. Moreover, such a configuration can avoid excessively increasing the load of the second gate line 22, so that insufficient charging of the sub-pixels in the second sub-pixel row can be avoided, thereby reducing the power consumption of the display panel.

In an embodiment of the present disclosure, a cross-sectional area of the first gate line 21 may be set larger than a cross-sectional area of the second gate line 22, in order to balance the loads of the first gate line 21 and the second gate line 22. For example, when the first gate line 21 and the second gate line 22 have a same thickness, a width of the first gate line 21 may be set larger than a width of the second gate line 22. In an embodiment of the present disclosure, the thickness direction of each of the gate lines (including the first gate line 21 and the second gate line 22) is perpendicular to the plane of the display panel, and the width direction of the gate line is parallel to the plane of the display panel and is perpendicular to an extending direction of the gate line. Alternatively, in an embodiment of the present disclosure, the thickness of the first gate line 21 may be larger than the thickness of the second gate line 22. Under the condition of balancing the loads of the first gate line 21 and the second gate line 22, an area of the black matrix for shielding the first gate line 21 is prevented from increasing in order to guarantee the aperture ratio of the sub-pixels electrically connected to the first gate lines 21 in the first display region AA1. In this situation, compared with a solution in which the first gate line 21 and the second gate line 22 have a same cross-sectional area, in this embodiment of the present disclosure, the length of the gate compensation line 20 electrically connected to the second gate line 22 can be set to be shorter. With such a configuration, it is possible to avoid excessively increasing the signal delay degree of the second gate line 22 and to avoid insufficient charging of the sub-pixels in the second sub-pixel row 12.

Figure 12:
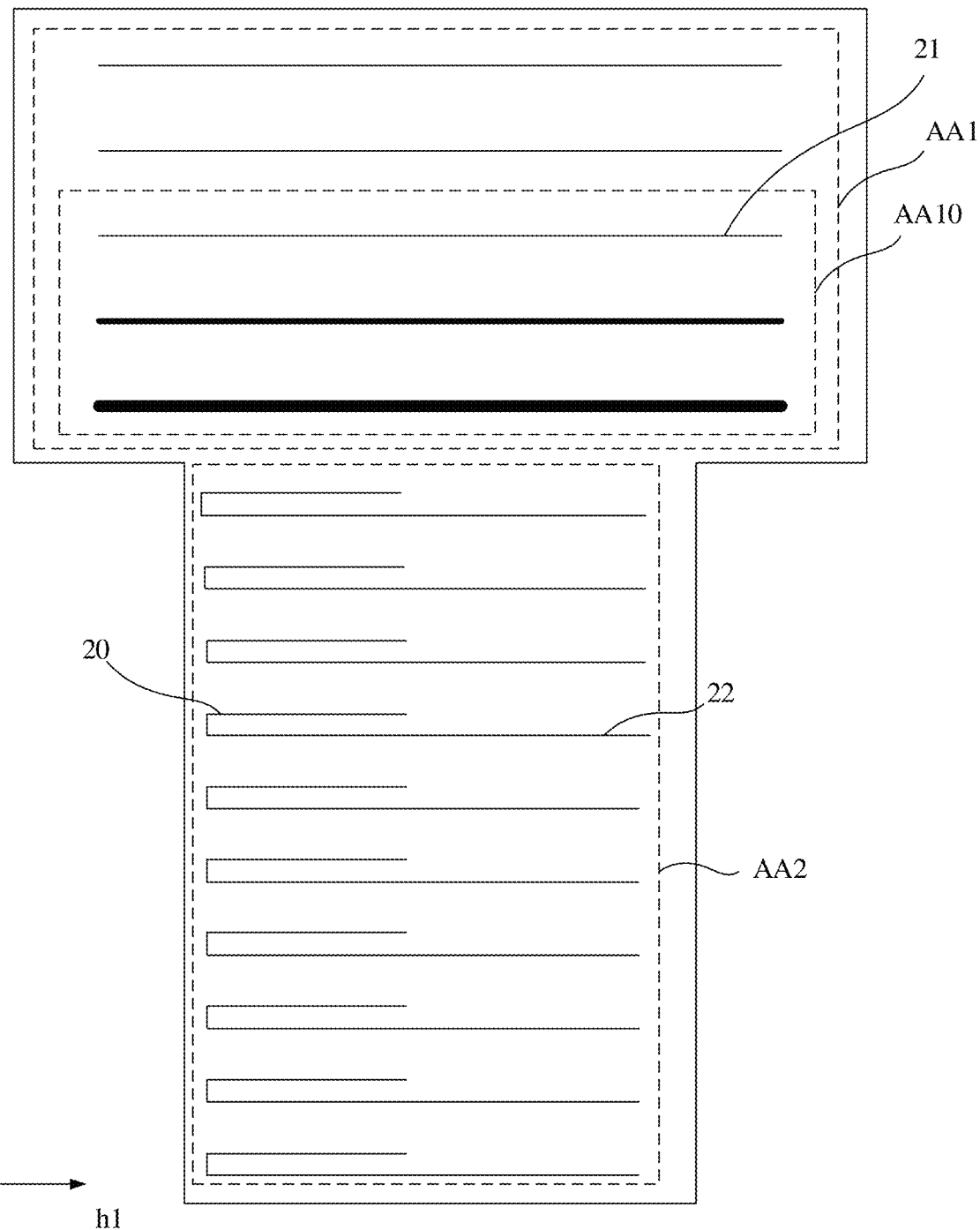
FIG. 12 is an enlarged schematic diagram showing a display panel according to another embodiment of the present disclosure.

FIG. 12 is an enlarged schematic diagram showing a display panel according to another embodiment of the present disclosure. Exemplarily, as shown in FIG. 12, the first display region AA1 of the display panel includes a second transition region AA10 adjacent to the second display region AA2. In the second transition region AA10, the first gate line 21 have a cross-sectional area gradually increasing along a direction from the first display region AA1 to the second display region AA2. With such a configuration, the brightness of the sub-pixels located at the junction position between the first display region AA1 and the second display region AA2 can have a gradient with a small change range, so that the human eye cannot easily observe the brightness difference. Moreover, such a configuration can avoid excessively increasing the load of the second gate line 22, so that insufficient charging of the sub-pixels in the second sub-pixel row can be avoided, thereby reducing the power consumption of the display panel.

Figure 13:
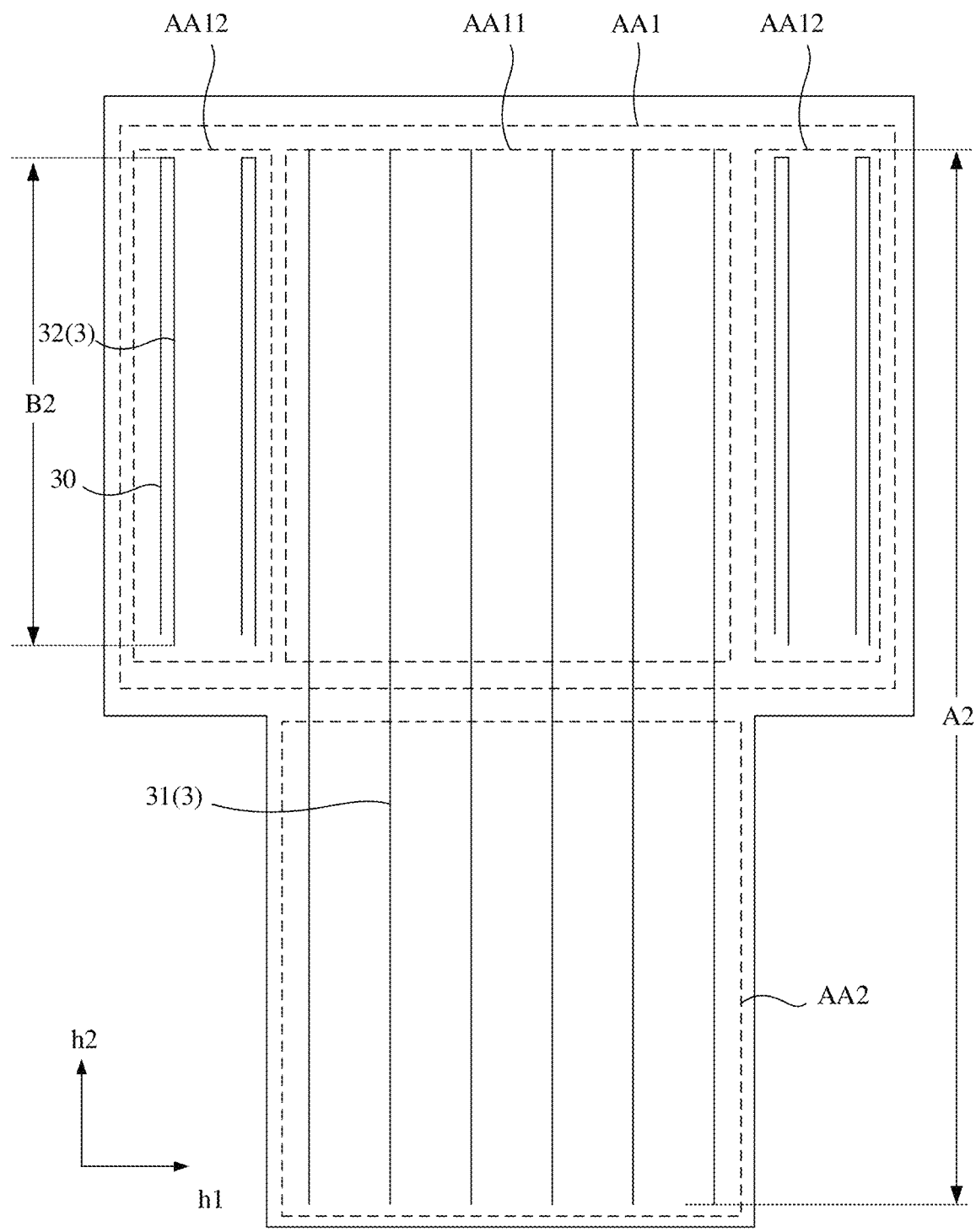
FIG. 13 is a schematic diagram showing a display panel according to another embodiment of the present disclosure.

FIG. 13 is a schematic diagram showing a display panel according to another embodiment of the present disclosure. Exemplarily, as shown in FIG. 13, the first display region AA1 includes a first display sub-region AA11 and a second display sub-region AA12. In the second direction h2, the first display sub-region AA11 overlaps with the second display region AA2, and the second display sub-region AA12 does not overlap with the second display region AA2. The data line 3 includes a first data line 31 and a second data line 32. The first data line 31 and the second data line 32 each extend along the second direction h2. The first data line 31 extends from the first display sub-region AA11 to the second display region AA2, and the second data line 32 is located in the second display sub-region AA12. As shown in FIG. 13, the length of the second data line 32 is smaller than the length of the first data line 31.

As shown in FIG. 13, the display panel further includes data compensation lines 30. The data compensation line 30 is connected to the second data line 32. The data compensation line 30 is configured to compensate for the load difference between the first data line 31 and the second data line 32. The compensation line 30 and the second data line 32 are arranged along the first direction h1. With such a configuration, while reducing the influence of the load difference between the first gate line 21 and the second gate line 22 on the display effects of the first display region AA1 and the second display region AA2, it can alleviate an influence of the load difference between the first data line 31 and the two data lines 32 on the display effects of the first display sub-region AA11 and the second display sub-region AA12, so that screen split at the junction position between the first display sub-region AA11 and the second display sub-region AA12 can be avoided.

In the embodiments of the present disclosure, when the data compensation line 30 is provided, the data compensation line 30 and the second data line 32 can be provided in a same layer to simplify the manufacturing process of the display panel. The data compensation line 30 and the gate compensation line 20 are arranged in different layers, and the data compensation line 30 intersects with and is insulated from the gate compensation line 20.

Figure 14:
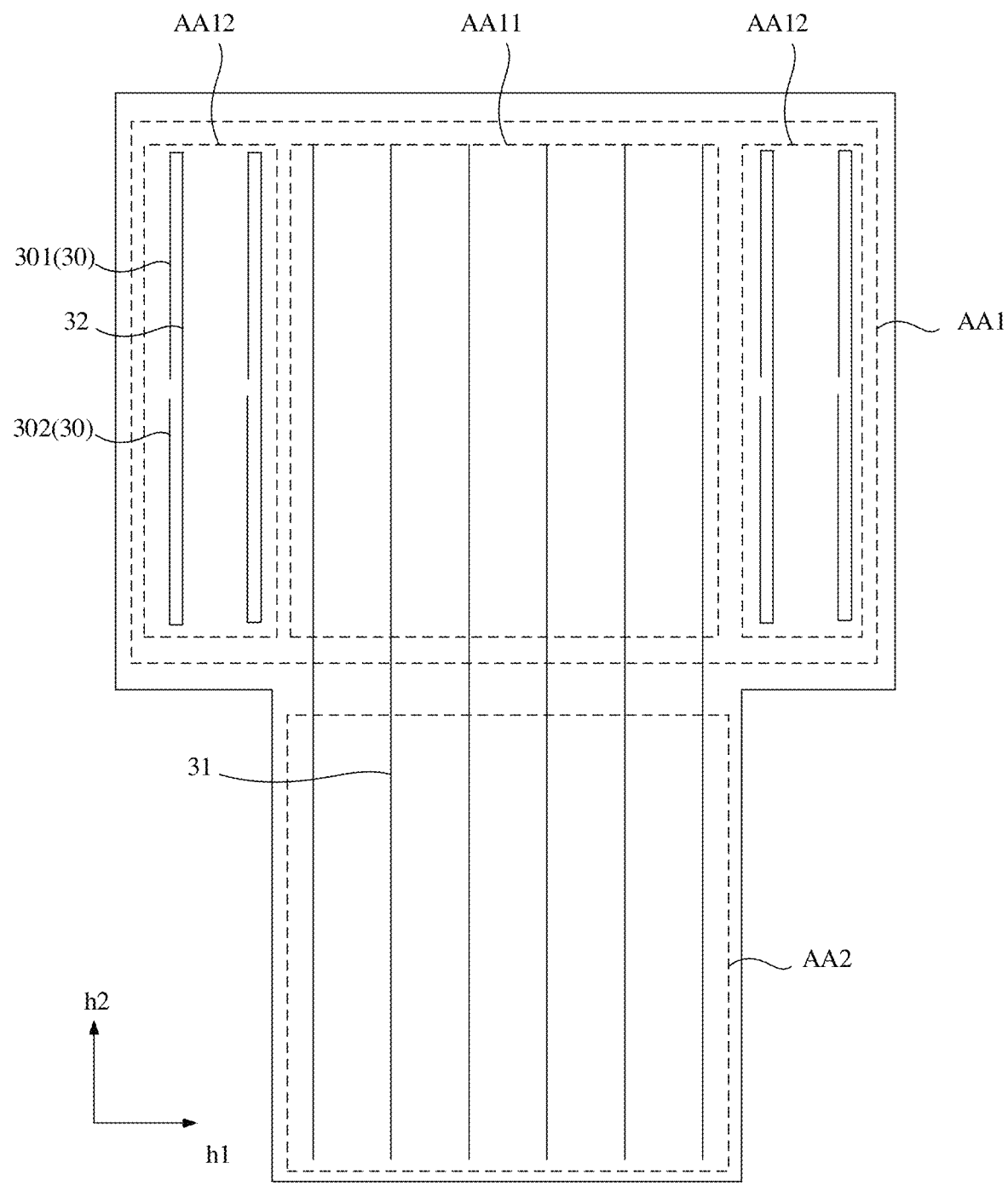
FIG. 14 is a schematic diagram showing a display panel according to another embodiment of the present disclosure.

FIG. 14 is a schematic diagram showing a display panel according to another embodiment of the present disclosure. In an embodiment of the present disclosure, as shown in FIG. 14, the data compensation line 30 includes a first data compensation sub-line 301 and a second data compensation sub-line 302. The first data compensation sub-line 301 is electrically connected to a first end of the second data line 32, and the second data compensation sub-line 302 is connected to a second end of the second data line 32. The first data compensation sub-line 301 at least partially overlaps with the second data compensation sub-line 302 in the second direction h2. In this embodiment of the present disclosure, the first data compensation sub-line 301 at least partially overlaps with the second data compensation sub-line 302 in the second direction h2, so that a space width occupied by the first data compensation sub-line 301 and the second data compensation sub-line 302 in the first direction h1 can be reduced, which is advantageous to guaranteeing the aperture ratio of pixels.

In an embodiment of the present disclosure, as shown in FIG. 13, when a length A2 of the first data line 31 in the second direction h2 and a length B2 of the second data line 32 in the second direction h2 satisfy B2<A2≤2B2, the data compensation line 30 can be located in the second display sub-region AA12. In an embodiment of the present disclosure, the data compensation line 30 may be provided close to the second data line 32 electrically connected thereto. In other words, for the data compensation line 30 and the second data line 32 that are connected to each other, setting other traces between the data compensation line 30 and the second data line 32 can be avoided, thereby alleviating the coupling interference between the data signal and other signals.

Figure 15:
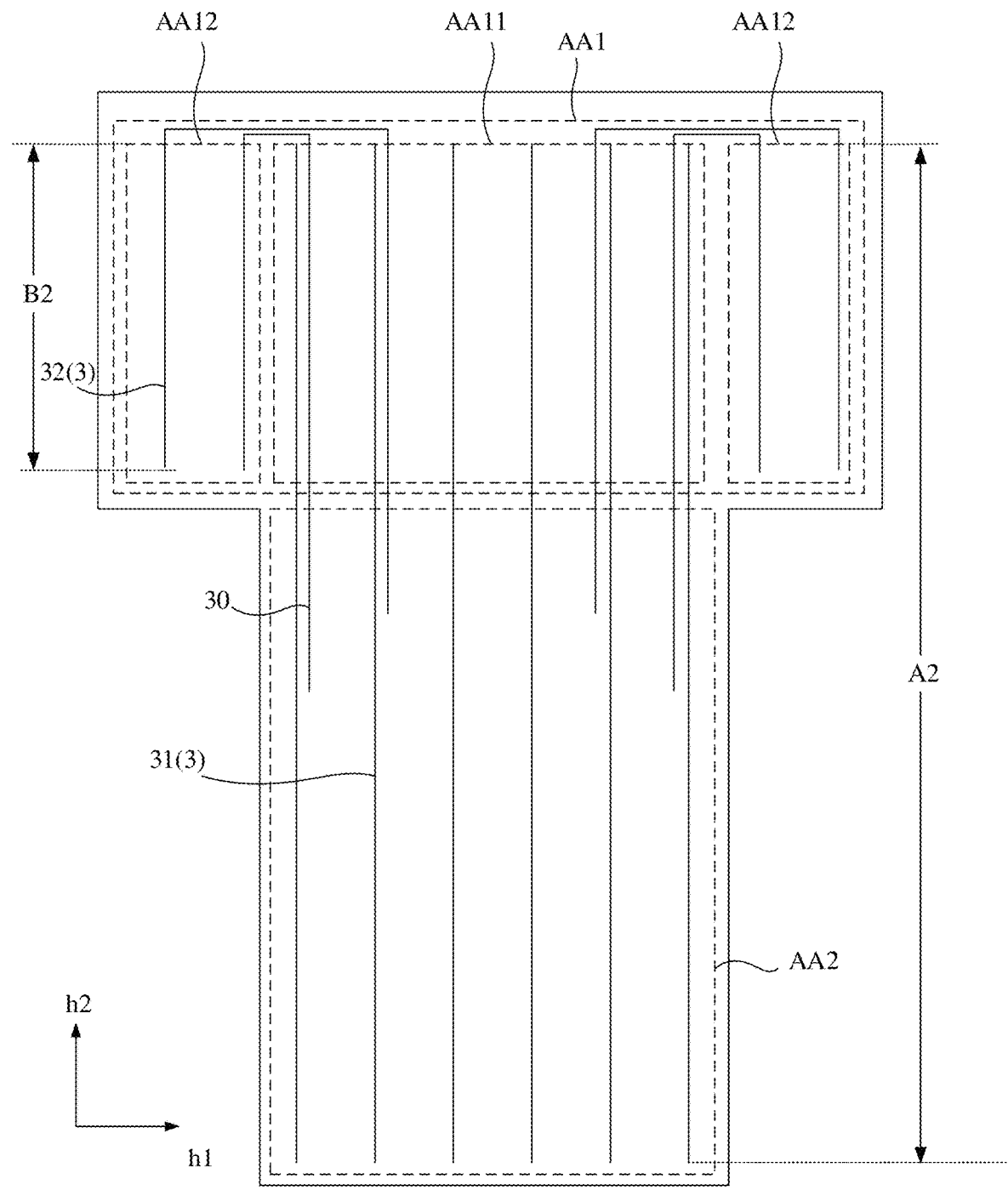
FIG. 15 is a schematic diagram showing a display panel according to another embodiment of the present disclosure.

FIG. 15 is a schematic diagram showing a display panel according to another embodiment of the present disclosure. Exemplarily, as shown in FIG. 15, when A2>2B2, that is, when the load difference between the first data line 31 and the second data line 32 is relatively large, in an embodiment of the present disclosure, at least a part of the data compensation line 30 can extend from the first display sub-region AA11 to the second display region AA2, so that a problem that the data compensation line 30 occupies a large space when the data compensation line 30 is entirely arranged in the second display sub-region AA12 and needs to be bent multiple times can be avoided. In an embodiment of the present disclosure, at least a part of the data compensation line 30 extends from the first display sub-region AA11 to the second display region AA2, so that at most two line segments extending along the second direction h2 can be provided between two adjacent sub-pixel columns of the display panel. One of the two line segments is the data line 3 (including the first data line 31 or the second data line 32), and the other one of two line segments is the data compensation line 30. With such a configuration, the width between two adjacent sub-pixel columns can be as narrow as possible to guarantee the aperture ratio of pixels. The sub-pixel column includes multiple sub-pixels arranged along the second direction h2. One sub-pixel column is electrically connected to one data line.

In an embodiment of the present disclosure, in order to balance the loads of the first data line 31 and the second data line 32, a cross-sectional area of the first data line 31 may be larger than a cross-sectional area of the second data line 32. Compared with a solution in which the cross-sectional area of the first data line 31 is equal to the cross-sectional area of the second data line 32, in this embodiment of the present disclosure, the data compensation line 30 electrically connected to the second data line 32 can have a smaller length. With such a configuration, it is possible to avoid excessively increasing the signal delay degree of the second data line 32 and to avoid insufficient charging of the sub-pixels in the sub-pixel column connected to the second data line 32.

Figure 16:
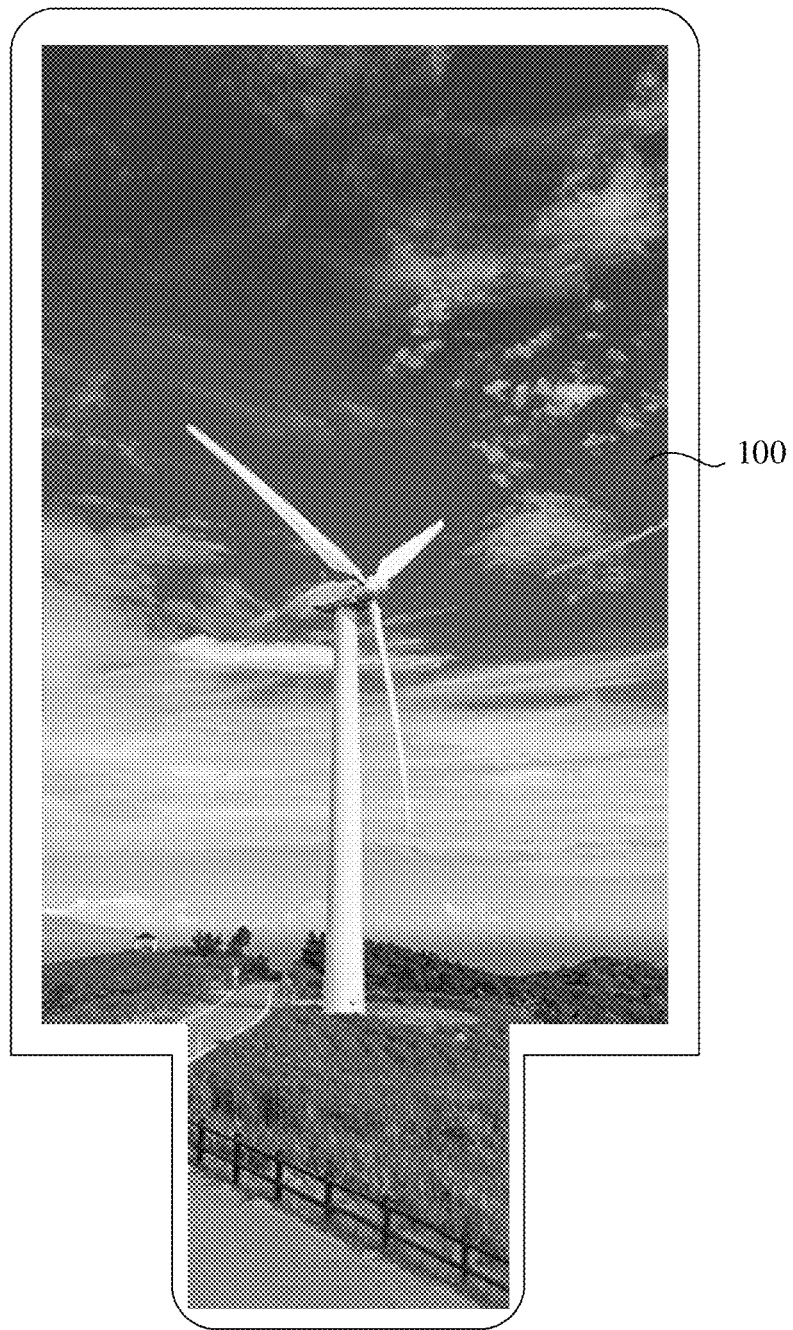
FIG. 16 is a schematic diagram showing a display apparatus according to an embodiment of the present disclosure.

The present disclosure also provides a display apparatus. FIG. 16 is a schematic diagram showing a display apparatus according to an embodiment of the present disclosure. As shown in FIG. 16, the display apparatus includes the display panel 100 described above. A structure of the display panel 100 has been described in detail in the above embodiments, and will not be elaborated herein. It should be noted that the display apparatus shown in FIG. 16 is only a schematic illustration. The display apparatus according to the present disclosure can be any electronic device having a display function, such as a mobile phone, a tablet computer, a laptop computer, an electronic paper book, a television or an on-board display screen.

The above are merely some embodiments of the present disclosure, which, as mentioned above, are not intended to limit the present disclosure. Within the principles of the present disclosure, any modification, equivalent substitution, improvement shall fall into the protection scope of the present disclosure.

The invention claimed is:

1. A display panel, comprising a first display region and a second display region, the display panel comprising:
   a plurality of first sub-pixel rows and a plurality of first gate lines arranged in the first display region, wherein each first sub-pixel row of the plurality of first sub-pixel rows comprises a plurality of sub-pixels arranged along a first direction, and the plurality of first sub-pixel rows is arranged in a second direction; the second direction intersects with the first direction; the first display region and the second display region are arranged along the second direction; and each gate line of the plurality of first gate lines is electrically connected to a respective first sub-pixel row of the plurality of first sub-pixel rows, and each first gate line of the plurality of first gate lines extends along the first direction;
   a plurality of second sub-pixel rows and a plurality of second gate lines arranged in the second display region; each second sub-pixel row of the plurality of second sub-pixel rows comprises a plurality of sub-pixels arranged along the first direction, and the plurality of second sub-pixel rows is arranged along the second direction; each of the plurality of second gate lines is connected to a respective second sub-pixel row of the plurality of second sub-pixel rows, and each second gate line of the plurality of second gate lines extends along the first direction; and a length of a second gate line of the plurality of second gate lines is smaller than a length of a first gate line of the plurality of first gate lines;
   at least one gate compensation line electrically connected to the plurality of second gate lines, wherein a gate compensation line of the at least one gate compensation line and a second gate line of the plurality of second gate lines are arranged along the second direction; and a gate compensation line of the at least one gate compensation line and a second gate line of the plurality of second gate lines that are connected to each other are electrically connected to a same second sub-pixel row of the plurality of second sub-pixel rows;
transistors;
pixel electrodes; and
data lines,
wherein a transistor of the transistors comprises a control electrode electrically connected to a second gate line of the plurality of second gate lines, a first electrode electrically connected to a pixel electrode of the pixel electrodes, and a second electrode electrically connected to a data line of the data lines;
wherein a transistor of the transistors comprises an active layer; the active layer has a first doping region and at least two second doping regions; the first doping region is doped with a material different from a material with which each of the at least two second doping regions is doped, the first doping region is located between two adjacent second doping regions of the at least two second doping regions; a first second doping region of the at least two second doping regions is electrically connected to the first electrode, and a second second doping region of at least two second doping regions is electrically connected to the second electrode;
wherein the first doping region overlaps with the control electrode of the transistor in a direction perpendicular to a plane of the display panel, and the first doping region forms a channel;
an orthographic projection of the plurality of second gate lines on the plane of the display panel overlaps with an orthographic projection of the first doping region on the plane of the display panel; and
an orthographic projection of the at least one gate compensation line on the plane of the display panel does not overlap with the orthographic projection of the first doping region on the plane of the display panel.

2. The display panel according to claim 1, wherein the orthographic projection of the at least one gate compensation line on the plane of the display panel does not overlap with an orthographic projection of at least one of the at least two second doping regions on the plane of the display panel.

3. The display panel according to claim 1, wherein the active layer further has at least two third doping regions located between the first doping region and the at least two second doping regions; each of the at least two third doping regions is doped with a material that is the same as a material with which each of the at least two second doping regions is doped; and a conductivity of each of the at least two third doping regions is smaller than a conductivity of each of the at least two second doping regions; and
the orthographic projection of the at least one gate compensation line on the plane of the display panel does not overlap with an orthographic projection of at least one of the at least two third doping regions on the plane of the display panel.

4. The display panel according to claim 1, wherein a gate compensation line of the at least one gate compensation line comprises a first gate compensation sub-line and a second gate compensation sub-line, the first gate compensation sub-line is electrically connected to a first end of one of the plurality of second gate lines, and the gate compensation sub-line is electrically connected to a second end of a second gate line of the plurality of the second gate lines; and
the first gate compensation sub-line at least partially overlaps with the second gate compensation sub-line in the first direction.

5. The display panel according to claim 1, further comprising a plurality of vertical shift registers, wherein a second gate line of the plurality of second gate lines is electrically connected to two of the plurality of vertical shift registers.

6. The display panel according to claim 1, wherein a second gate line of the plurality of second gate lines is electrically connected to the control electrode of a transistor of the transistors;
a gate compensation line of the at least one gate compensation line extends along the first direction; and
for a gate compensation line of the at least one gate compensation line and a second gate line of the plurality of second gate lines that are connected to a same pixel, the gate compensation line is located at a side of the second gate line close to the pixel electrode of the pixel.

7. The display panel according to claim 1, wherein a length A1 of the first display region in the first direction and a length B1 of the second display region in the first direction satisfy A1≤2B1; and
at least one gate compensation line of the at least one gate compensation line is located in the second display region.

8. The display panel according to claim 7, wherein a second gate line of the plurality of second gate lines and a gate compensation line of the plurality of gate compensation lines that are connected to each other are located between two adjacent second sub-pixel rows of the plurality of second sub-pixel rows.

9. The display panel according to claim 8, wherein the second display region comprises a first transition region adjacent to the first display region; and
in the first transition region, each gate compensation line of the plurality of gate compensation lines has a length gradually increasing along a direction from the second display region to the first display region.

10. The display panel according to claim 1, wherein a length A1 of the first display region in the first direction and a length B1 of the second display region in the first direction satisfy A1>2B1; and
at least a part of a gate compensation line of the plurality of gate compensation lines is located in the first display region.

11. The display panel according to claim 10, wherein the at least one gate compensation line comprises a plurality of gate compensation lines, wherein a first distance between the second display region and a gate compensation line of the plurality of gate compensation lines located in the first display region is in direct proportion to a second distance between the first display region and a second gate line of the plurality of second gate lines connected to the gate compensation line.

12. The display panel according to claim 1, further comprising a black matrix, wherein an orthographic projection of the black matrix on the plane of the display panel covers the plurality of second gate lines and the at least one gate compensation line.

13. The display panel according to claim 1, wherein the at least one gate compensation line and the plurality of second gate lines are arranged in a same layer.

14. The display panel according to claim 1, wherein a cross-sectional area of a first gate line of the plurality of first gate lines is larger than a cross-sectional area of a second gate line of the plurality of second gate lines.

15. The display panel according to claim 14, wherein the first display region comprises a second transition region adjacent to the second display region; and in the second transition region, each first gate line of the plurality of first gate lines has a cross-sectional area gradually increasing along a direction from the first display region to the second display region.

16. The display panel according to claim 1, wherein the first display region comprises a first display sub-region and a second display sub-region, the first display sub-region overlaps with the second display region along the second direction, and the second display sub-region does not overlap with the second display region along the second direction;

wherein the data lines comprises a first data line and a second data line, the first data line and the second data line each extend along the second direction; the first data line extends from the first display sub-region to the second display region, and the second data line is located in the second display sub-region;

wherein a length of the second data line is smaller than a length of the first data line; and wherein the display panel further comprises a data compensation line connected to the second data line, the data compensation line is configured to compensate for a load difference between the first data line and the second data line, and the data compensation line and the second data line are arranged along the first direction.

17. The display panel according to claim 16, wherein the data compensation line comprises a first data compensation sub-line and a second data compensation sub-line, the first data compensation sub-line is electrically connected to a first end of the second data line, and the second data compensation sub-line is connected to a second end of the second data line; and the first data compensation sub-line at least partially overlaps with the second data compensation sub-line in the second direction.

18. The display panel according to claim 16, wherein a length A2 of the first data line in the second direction and a length B2 of the second data line in the second direction satisfy A1>2B1, and wherein the data compensation line is located in the second display sub-region.

19. The display panel according to claim 16, wherein a length A2 of the first data line in the second direction and a length B2 of the second data line in the second direction satisfy A1>2B1; and at least a part of the data compensation line extends from the first display sub-region to the second display region.

20. A display apparatus, comprising a display panel comprising a first display region and a second display region, the display panel comprising:

a plurality of first sub-pixel rows and a plurality of first gate lines arranged in the first display region, wherein each first sub-pixel row of the plurality of first sub-pixel rows comprises a plurality of sub-pixels arranged along a first direction, and the plurality of first sub-pixel rows is arranged in a second direction; the second direction intersects with the first direction; and the first display region and the second display region are arranged along the second direction; and each first gate line of the plurality of first gate lines is electrically connected to a respective first sub-pixel row of the plurality of first sub-pixel rows, and each first gate line of the plurality of first gate lines extends along the first direction;

a plurality of second sub-pixel rows and a plurality of second gate lines arranged in the second display region; each second sub-pixel row of the plurality of second sub-pixel rows comprises a plurality of sub-pixels arranged along the first direction, and the plurality of second sub-pixel rows is arranged along the second direction; and each second gate line of the plurality of second gate lines is connected to a respective second sub-pixel row of the plurality of second sub-pixel rows, and each second gate line of the plurality of second gate lines extends along the first direction; and a length of a second gate line of the plurality of second gate lines is smaller than a length of a first gate line of the plurality of first gate lines;

at least one gate compensation line electrically connected to the plurality of second gate lines, wherein a gate compensation line of the at least one gate compensation line and a second gate line of the plurality of second gate lines are arranged along the second direction; and a gate compensation line of the at least one gate compensation line and second gate line of the plurality of second gate lines that are connected to each other are electrically connected to a same second sub-pixel row of the plurality of second sub-pixel rows;

transistors, pixel electrodes, and data lines, wherein a transistor of the transistors comprises a control electrode electrically connected to a second gate line of the plurality of second gate lines, a first electrode electrically connected to a pixel electrode of the pixel electrodes, and a second electrode electrically connected to a data line of the data lines;

wherein a transistor of the transistors comprises an active layer; the active layer has a first doping region and at least two second doping regions; the first doping region is doped with a material different from a material with which each of the at least two second doping regions is doped, the first doping region is located between two adjacent second doping regions of the at least two second doping regions; a first second doping of the at least two second doping regions is electrically connected to the first electrode, and a second second doping region of at least two second doping regions is electrically connected to the second electrode;

wherein the first doping region overlaps with the control electrode of the transistor in a direction perpendicular to a plane of the display panel, and the first doping region forms a channel;

an orthographic projection of the plurality of second gate lines on the plane of the display panel overlaps with an orthographic projection of the first doping region on the plane of the display panel; and an orthographic projection of the at least one gate compensation line on the plane of the display panel does not overlap with the orthographic projection of the first doping region on the plane of the display panel.

* * * * *